United States Patent
Gong et al.

(10) Patent No.: US 11,359,532 B2
(45) Date of Patent: Jun. 14, 2022

(54) SYSTEMS AND METHODS FOR IMPLEMENTING CORRECTIONS TO A REDUCTANT DELIVERY SYSTEM IN AN EXHAUST AFTERTREATMENT SYSTEM OF AN INTERNAL COMBUSTION ENGINE

(71) Applicant: CUMMINS EMISSION SOLUTIONS INC., Columbus, IN (US)

(72) Inventors: Jinqian Gong, Columbus, IN (US); Arun Kumar Dasari, Indianapolis, IN (US); Gautam Sharma, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 17/424,462

(22) PCT Filed: Jan. 10, 2020

(86) PCT No.: PCT/US2020/013033
§ 371 (c)(1),
(2) Date: Jul. 20, 2021

(87) PCT Pub. No.: WO2020/154108
PCT Pub. Date: Jul. 30, 2020

(65) Prior Publication Data
US 2022/0090529 A1    Mar. 24, 2022

Related U.S. Application Data

(60) Provisional application No. 62/795,263, filed on Jan. 22, 2019.

(51) Int. Cl.
*F01N 3/00* (2006.01)
*F01N 3/20* (2006.01)
*F01N 11/00* (2006.01)

(52) U.S. Cl.
CPC ............ *F01N 3/208* (2013.01); *F01N 11/002* (2013.01); *F01N 2550/02* (2013.01);
(Continued)

(58) Field of Classification Search
CPC .... F01N 3/208; F01N 11/002; F01N 2550/02; F01N 2560/026; F01N 2560/06;
(Continued)

(56) References Cited

U.S. PATENT DOCUMENTS 5,319,921 A * 6/1994 Gopp .................... F01N 11/007
60/276
7,093,427 B2 * 8/2006 van Nieuwstadt ...... F01N 9/005
60/276

(Continued)

FOREIGN PATENT DOCUMENTS

CN          104047692 A      9/2014

OTHER PUBLICATIONS

International Search Report and Written Opinion issued for PCT Application No. PCT/US2020/013033 dated Mar. 20, 2020, 16 pages.

(Continued)

*Primary Examiner* — Matthew T Largi
(74) *Attorney, Agent, or Firm* — Foley & Lardner LLP

(57) ABSTRACT

An exhaust aftertreatment system includes a catalyst, an exhaust conduit system, a first sensor, a second sensor, a reductant pump, a dosing module, and a reductant delivery system controller. The exhaust conduit system is coupled to the catalyst. The first sensor is coupled to the exhaust conduit system upstream of the catalyst and configured to obtain a current first measurement upstream of the catalyst. The second sensor is coupled to the exhaust conduit system downstream of the catalyst and configured to obtain a current second measurement downstream of the catalyst.

(Continued)

The reductant pump is configured to draw reductant from a reductant source. The dosing module is fluidly coupled to the reductant pump and configured to selectively provide the reductant from the reductant pump into the exhaust conduit system upstream of the catalyst. The reductant delivery system controller is communicable with the first sensor, the second sensor, the reductant pump, and the dosing module.

20 Claims, 11 Drawing Sheets

(52) U.S. Cl.
CPC .... *F01N 2560/026* (2013.01); *F01N 2560/06* (2013.01); *F01N 2610/144* (2013.01); *F01N 2900/0421* (2013.01); *F01N 2900/1602* (2013.01); *F01N 2900/1621* (2013.01)

(58) Field of Classification Search
CPC ....... F01N 2610/144; F01N 2900/0421; F01N 2900/1602; F01N 2900/1621
See application file for complete search history.

(56) References Cited

U.S. PATENT DOCUMENTS

| | | | |
|---|---|---|---|
| 7,832,199 B2 | 11/2010 | Toshioka | |
| 8,225,595 B2 | 7/2012 | Garimella et al. | |
| 9,133,750 B2* | 9/2015 | Levijoki | F01N 3/208 |
| 10,018,092 B2* | 7/2018 | Wang | F01N 13/0093 |
| 10,247,080 B2* | 4/2019 | Farid | F01N 11/00 |
| 10,677,231 B2* | 6/2020 | Young | F04B 23/02 |
| 10,808,590 B2* | 10/2020 | Shost | F01N 9/00 |
| 11,105,245 B2* | 8/2021 | Rajagopal | F01N 3/2066 |
| 2008/0010974 A1* | 1/2008 | Frazier | F01N 11/002 |
| | | | 60/285 |
| 2012/0151902 A1* | 6/2012 | Yi | B01F 25/3131 |
| | | | 60/303 |
| 2014/0260216 A1* | 9/2014 | Everard | F01N 3/208 |
| | | | 73/114.75 |
| 2017/0122159 A1 | 5/2017 | Bahrami | |

OTHER PUBLICATIONS

First Office Action issued for Indian Patent Application No. 202147030685, dated Sep. 15, 2021, 5 pages.

\* cited by examiner

SYSTEMS AND METHODS FOR IMPLEMENTING CORRECTIONS TO A REDUCTANT DELIVERY SYSTEM IN AN EXHAUST AFTERTREATMENT SYSTEM OF AN INTERNAL COMBUSTION ENGINE

CROSS-REFERENCE TO RELATED PATENT APPLICATION

This application claims the benefit of U.S. Provisional Patent Application No. 62/795,263, filed Jan. 22, 2019, the entire disclosure of which is incorporated herein by reference.

TECHNICAL FIELD

The present application relates generally to systems and methods for implementing corrections to a reductant delivery system in an exhaust aftertreatment system of an internal combustion engine.

BACKGROUND

For internal combustion engines, such as diesel engines, nitrogen oxide ($NO_x$) compounds may be emitted in exhaust. It may be desirable to reduce $NO_x$ emissions to, for example, comply with environmental regulations. To reduce $NO_x$ emissions, a reductant may be dosed into the exhaust by a dosing system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

In some situations, reductant may be utilized by a dosing system at a rate that is not optimized for the exhaust or engine. For example, as the dosing system ages, the dosing system may no longer be able to accurately determine characteristics of the exhaust that are used to determine how much reductant is dosed into the exhaust. As a result, the dosing system may dose more or less reductant than is needed. If more reductant is dosed than is needed, the reductant may accumulate within downstream components, such as a catalyst, thereby impacting the performance of these components, potentially causing $NO_x$ emissions to exceed desired amounts. If less reductant is dosed than is needed, $NO_x$ emissions may exceed desired amounts. When $NO_x$ emissions exceed desired amounts, a controller may indicate downstream components, such as a catalyst, as having failed. When such an indication occurs, the downstream components are typically serviced or replaced. However, if the excess of $NO_x$ emissions is due to the dosing system, and not a failure of the downstream components themselves, servicing and replacement of the downstream components may not remedy the excess of $NO_x$ emissions.

SUMMARY

In one embodiment, an exhaust aftertreatment system includes a catalyst, an exhaust conduit system, a first sensor, a second sensor, a reductant pump, a dosing module, and a reductant delivery system controller. The exhaust conduit system is coupled to the catalyst. The first sensor is coupled to the exhaust conduit system upstream of the catalyst and configured to obtain a current first measurement upstream of the catalyst. The second sensor is coupled to the exhaust conduit system downstream of the catalyst and configured to obtain a current second measurement downstream of the catalyst. The reductant pump is configured to draw reductant from a reductant source. The dosing module is fluidly coupled to the reductant pump and configured to selectively provide the reductant from the reductant pump into the exhaust conduit system upstream of the catalyst. The reductant delivery system controller is communicable with the first sensor, the second sensor, the reductant pump, and the dosing module. The reductant delivery system controller is configured to receive and store the current first measurement from the first sensor. The reductant delivery system controller is also configured to receive and store the current second measurement from the second sensor. The reductant delivery system controller is also configured to cause the reductant pump to draw the reductant at a first rate. The reductant delivery system controller is also configured to cause the dosing module to provide a first amount of the reductant. The reductant delivery system controller is also configured to determine a current conversion efficiency based on the current first measurement and the current second measurement. The reductant delivery system controller is also configured to store the current conversion efficiency. The reductant delivery system controller is also configured to determine a current low conversion efficiency time based on the current conversion efficiency. The reductant delivery system controller is also configured to determine a current bias index based on the current low conversion efficiency time. The reductant delivery system controller is also configured to compare the current bias index to a bias index threshold. The reductant delivery system controller is also configured to adjust at least one of the first rate or the first amount when the current bias index is greater than the bias index threshold.

In another embodiment, an exhaust aftertreatment system includes a catalyst, a first sensor, a second sensor, a reductant pump, a dosing module, and a reductant delivery system controller. The first sensor is configured to obtain a current first measurement upstream of the catalyst. The second sensor coupled is configured to obtain a current second measurement downstream of the catalyst. The second sensor is also configured to obtain, prior to obtaining the current second measurement, a previous second measurement downstream of the catalyst. The reductant pump is configured to draw reductant from a reductant source. The dosing module is fluidly coupled to the reductant pump and configured to selectively provide the reductant from the reductant pump upstream of the catalyst. The reductant delivery system controller is communicable with the first sensor, the second sensor, the reductant pump, and the dosing module. The reductant delivery system controller is configured to receive and store the previous second measurement from the second sensor. The reductant delivery system controller is also configured to receive and store the current first measurement from the first sensor. The reductant delivery system controller is also configured to receive and store the current second measurement from the second sensor. The reductant delivery system controller is also configured to cause the reductant pump to draw the reductant at a first rate. The reductant delivery system controller is also configured to cause the dosing module to provide a first amount of the reductant. The reductant delivery system controller is also configured to determine a current conversion efficiency based on the current first measurement and the current second measurement. The reductant delivery system controller is also configured to store the current conversion efficiency. The reductant delivery system controller is also configured to determine a current low conversion efficiency time based on the current conversion efficiency. The reductant delivery system controller is also configured to determine an average second measurement differential based on the current second measurement and the previous second measurement. The reductant delivery system controller is also configured to compare an absolute value of the average second measurement differential to a second measurement spike initial threshold. The reductant delivery system controller is also configured to increase a positive bias counter in response to the absolute value of the average second measurement differential not being greater than the second measurement spike initial threshold. The reductant delivery system controller is also configured to compare the absolute value of the average second measurement differential to a second measurement spike secondary threshold in response to the absolute value of the average second measurement differential not being greater than the second measurement spike initial threshold. The reductant delivery system controller is also configured to increase a negative bias counter in response to the absolute value of the average second measurement differential not being less than the second measurement spike secondary threshold. The reductant delivery system controller is also configured to determine a current bias index based on the negative bias counter and at least one of: the current low conversion efficiency time or the positive bias counter. The reductant delivery system controller is also configured to compare the current bias index to a bias index threshold. The reductant delivery system controller is also configured to adjust at least one of the first rate or the first amount when the current bias index is greater than the bias index threshold.

In yet another embodiment, an exhaust aftertreatment system includes a catalyst, a first sensor, a second sensor, a catalyst temperature sensor, a reductant pump, a dosing module, and a reductant delivery system controller. The first sensor is configured to obtain a current first measurement upstream of the catalyst. The second sensor is configured to obtain a current second measurement downstream of the catalyst. The catalyst temperature sensor is coupled to the catalyst and configured to obtain a temperature of the catalyst. The reductant pump is configured to draw reductant from a reductant source. The dosing module is fluidly coupled to the reductant pump and configured to selectively provide the reductant from the reductant pump upstream of the catalyst. The reductant delivery system controller is communicable with the first sensor, the second sensor, the catalyst temperature sensor, the reductant pump, and the dosing module. The reductant delivery system controller is configured to cause the reductant pump to draw the reductant at a first rate. The reductant delivery system controller is also configured to cause the dosing module to provide a first amount of the reductant. The reductant delivery system controller is also configured to receive and store the current first measurement from the first sensor. The reductant delivery system controller is also configured to receive and store the current second measurement from the second sensor. The reductant delivery system controller is also configured to determine that the first sensor is obtaining the current first measurement. The reductant delivery system controller is also configured to determine that the second sensor is obtaining the current second measurement. The reductant delivery system controller is also configured to compare the catalyst temperature to a target catalyst temperature range. The reductant delivery system controller is also configured to, after determining that (i) the first sensor is obtaining the current first measurement, (ii) the second sensor is obtaining the current second measurement, and (iii) the catalyst temperature is within the target catalyst temperature range, determine a current conversion efficiency based on the current first measurement and the current second measurement. The reductant delivery system controller is also configured to store the current conversion efficiency. The reductant delivery system controller is also configured to adjust at least one of the first rate or the first amount based on the current conversion efficiency.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
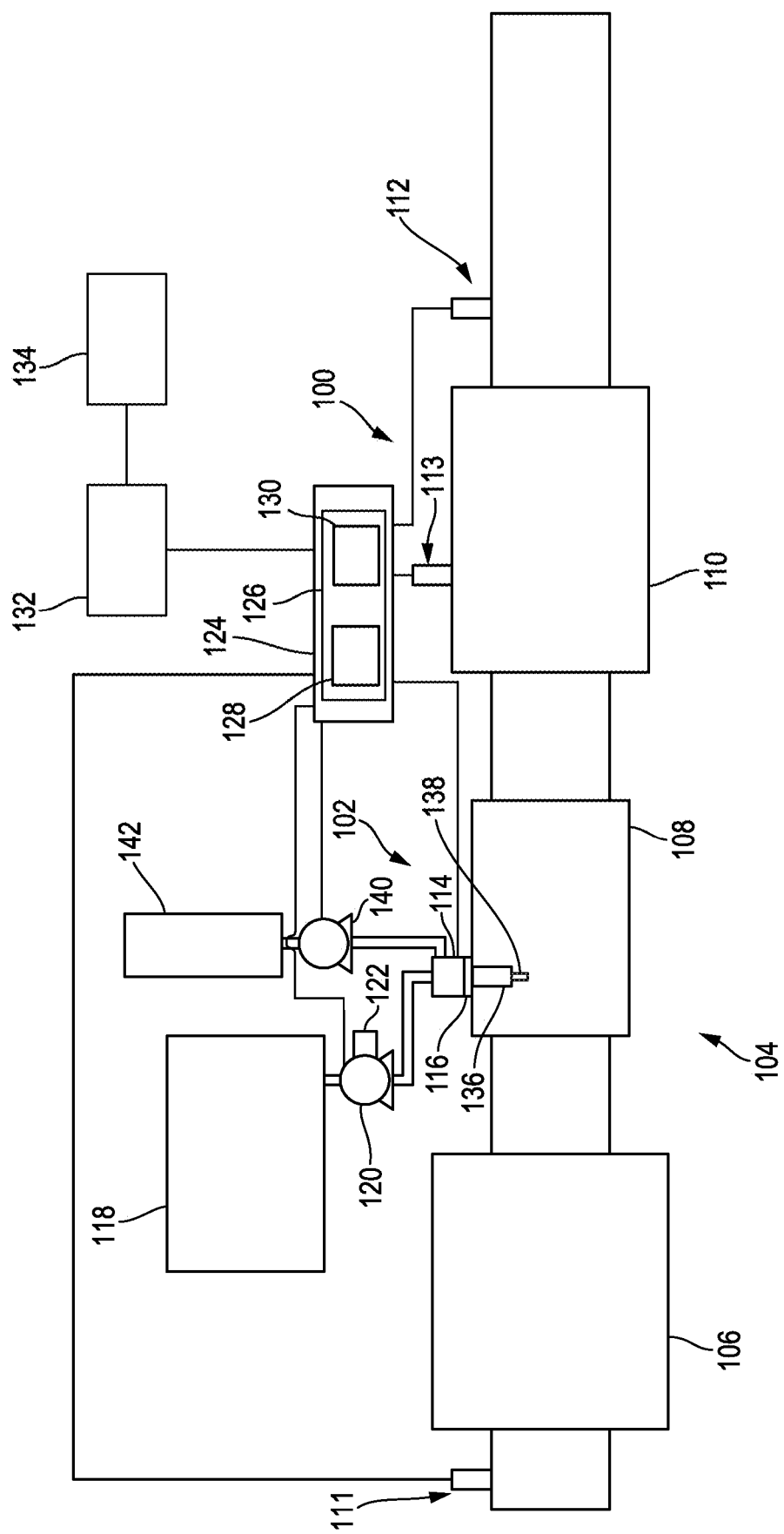
FIG. 1 is a block schematic diagram of an example exhaust aftertreatment system.
Figure 2:
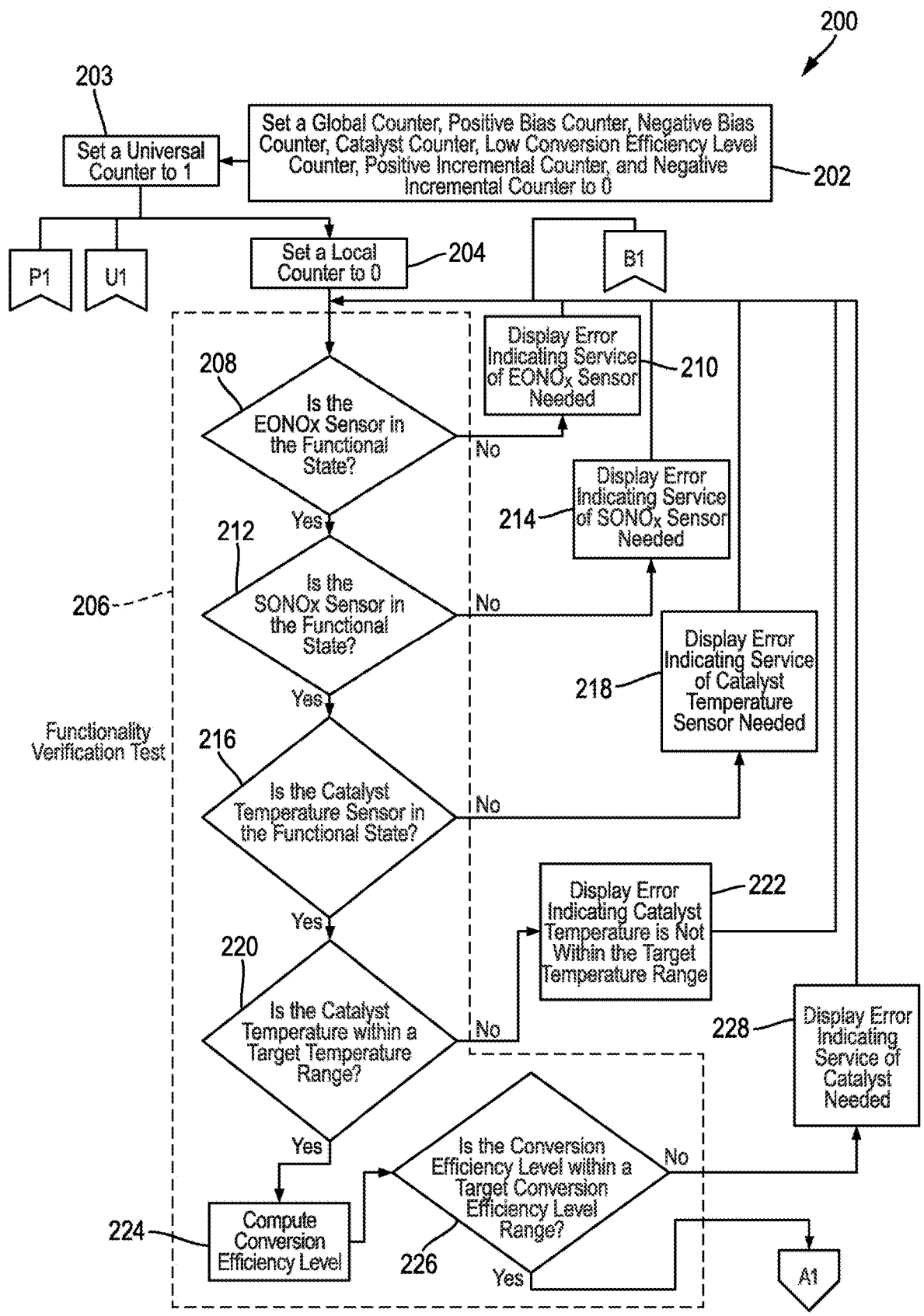
FIGS. 2-10 are a block schematic diagram of an example reductant delivery system control strategy for a reductant delivery system controller for use in an exhaust aftertreatment system, such as the example exhaust aftertreatment system shown in FIG. 1.
Figure 3:
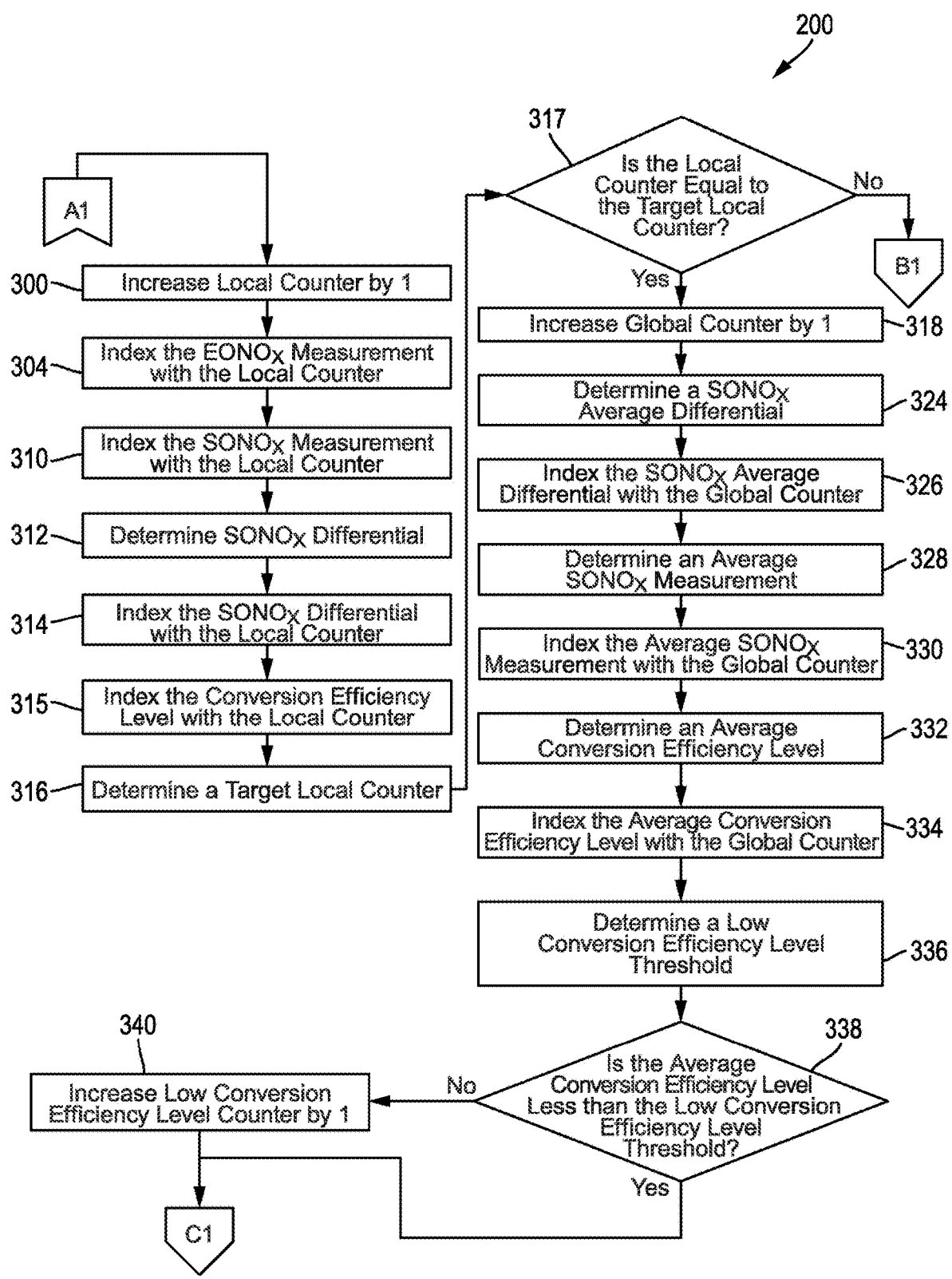
Figure 4:
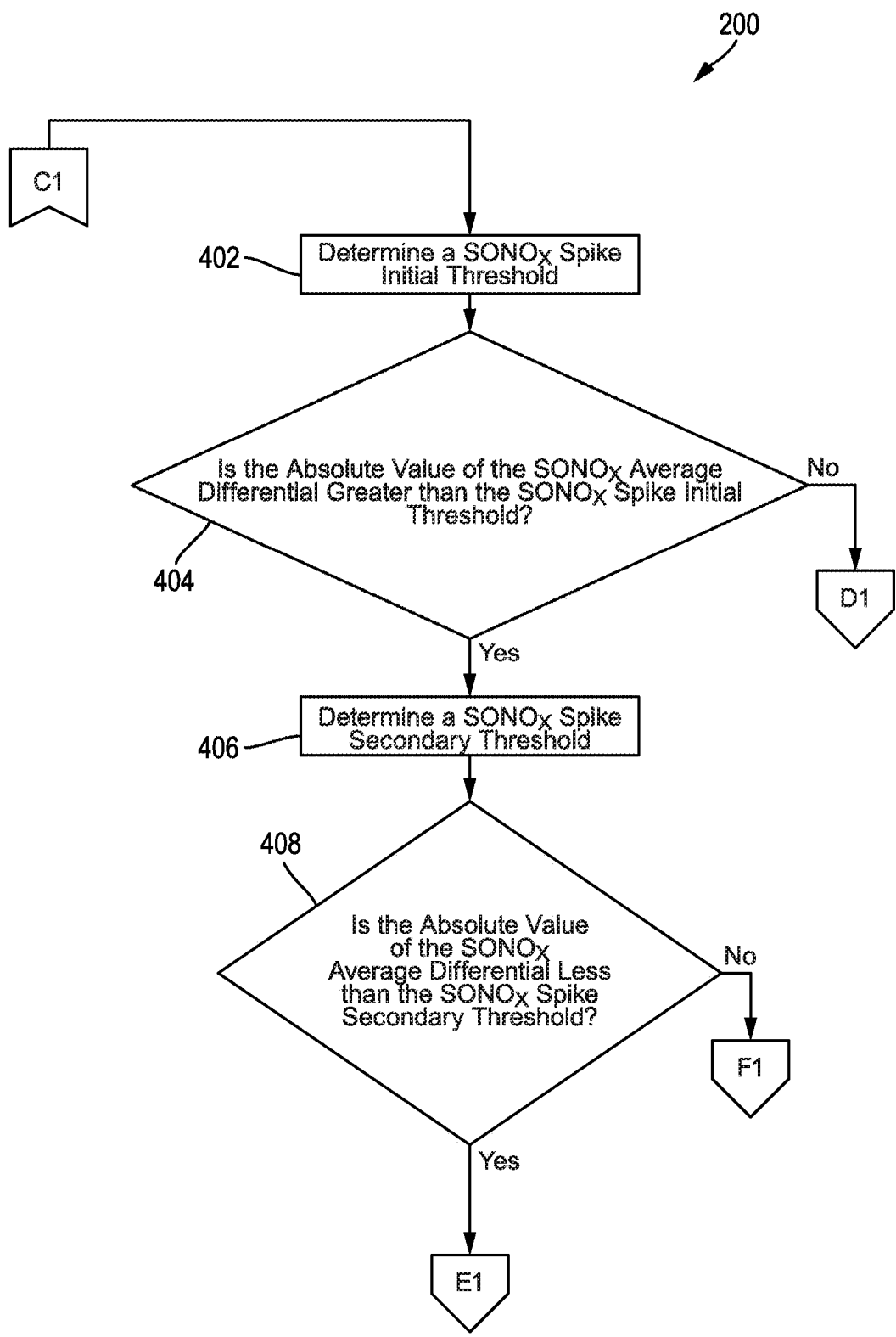
Figure 5:
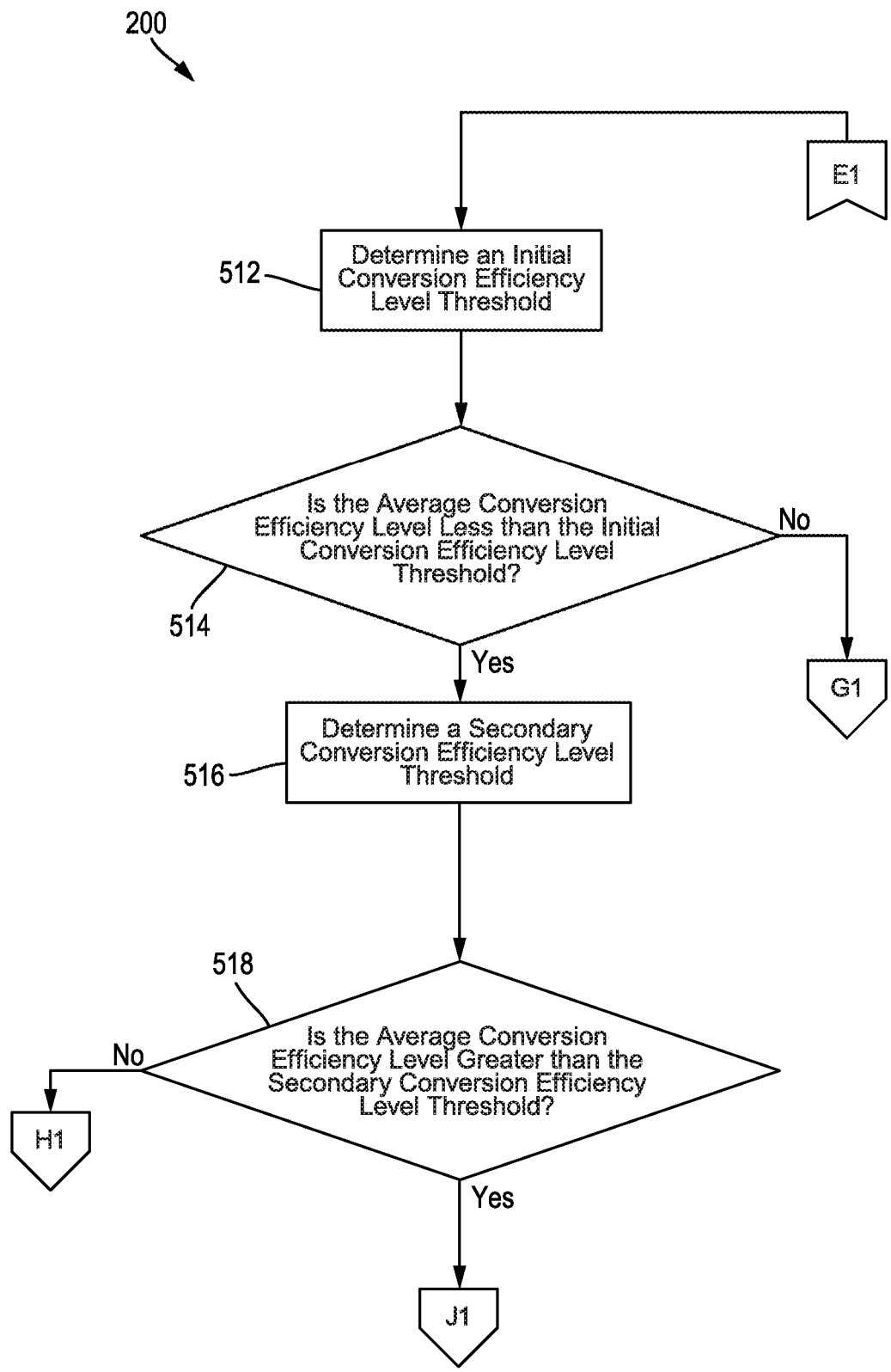
Figure 6:
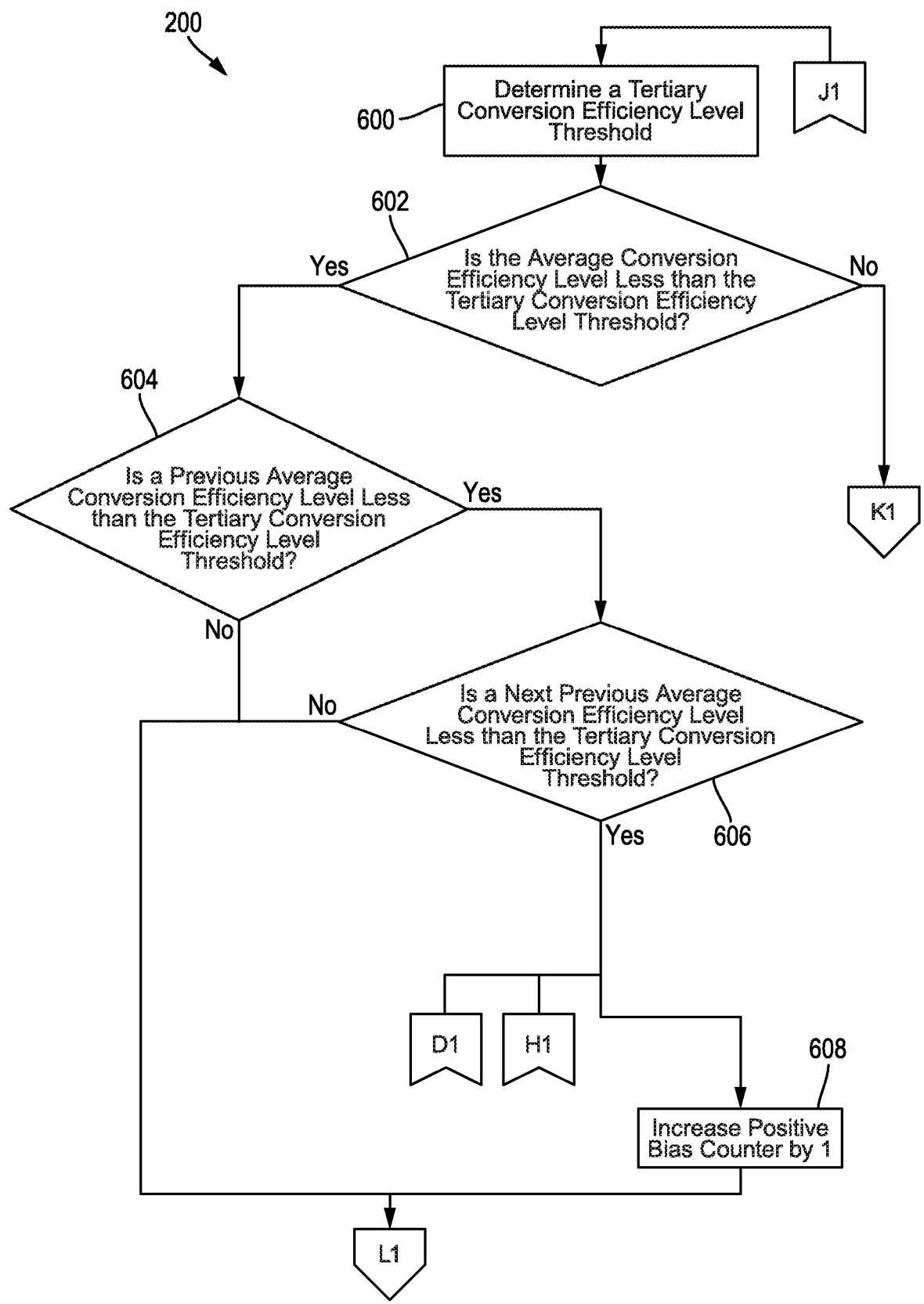
Figure 7:
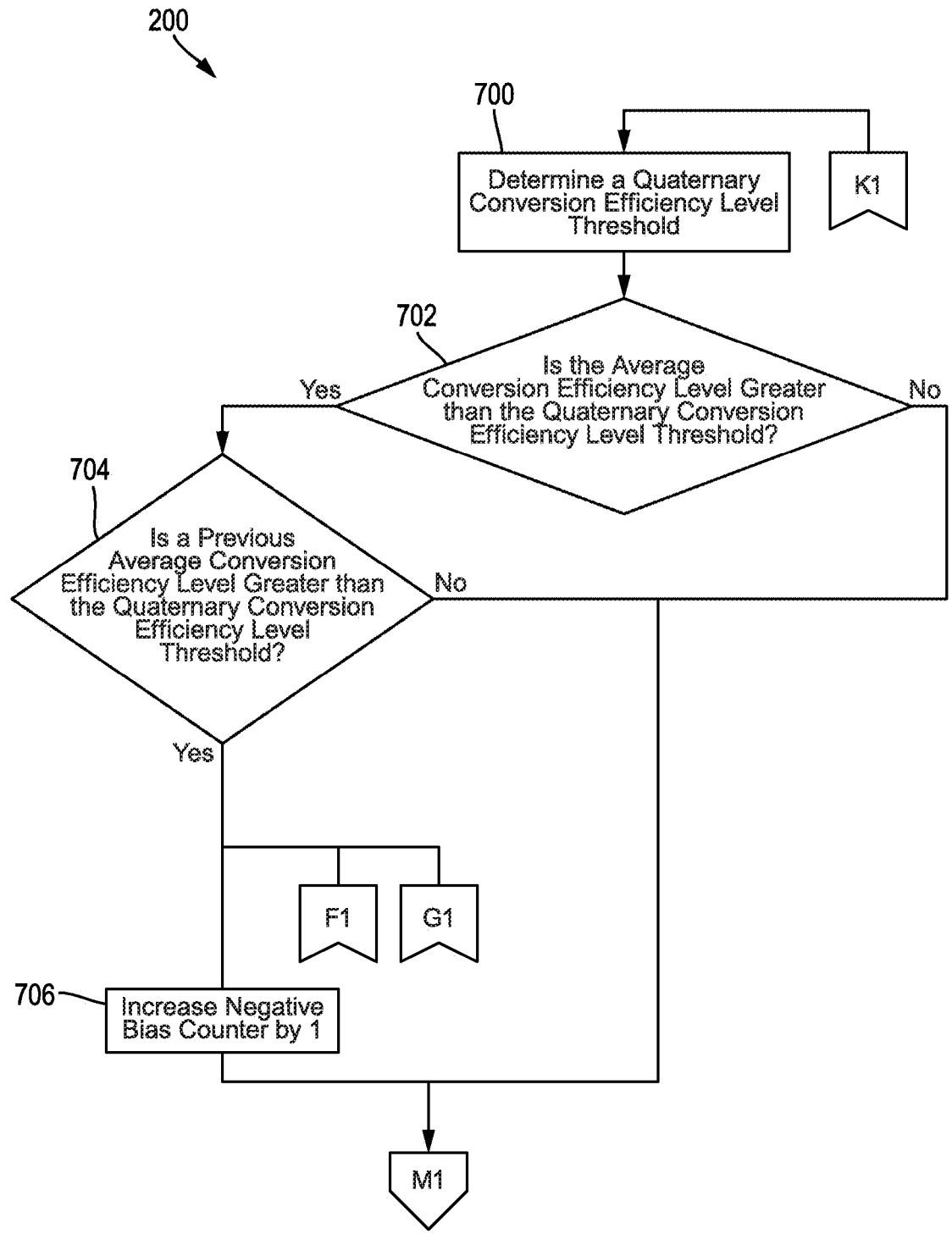
Figure 8:
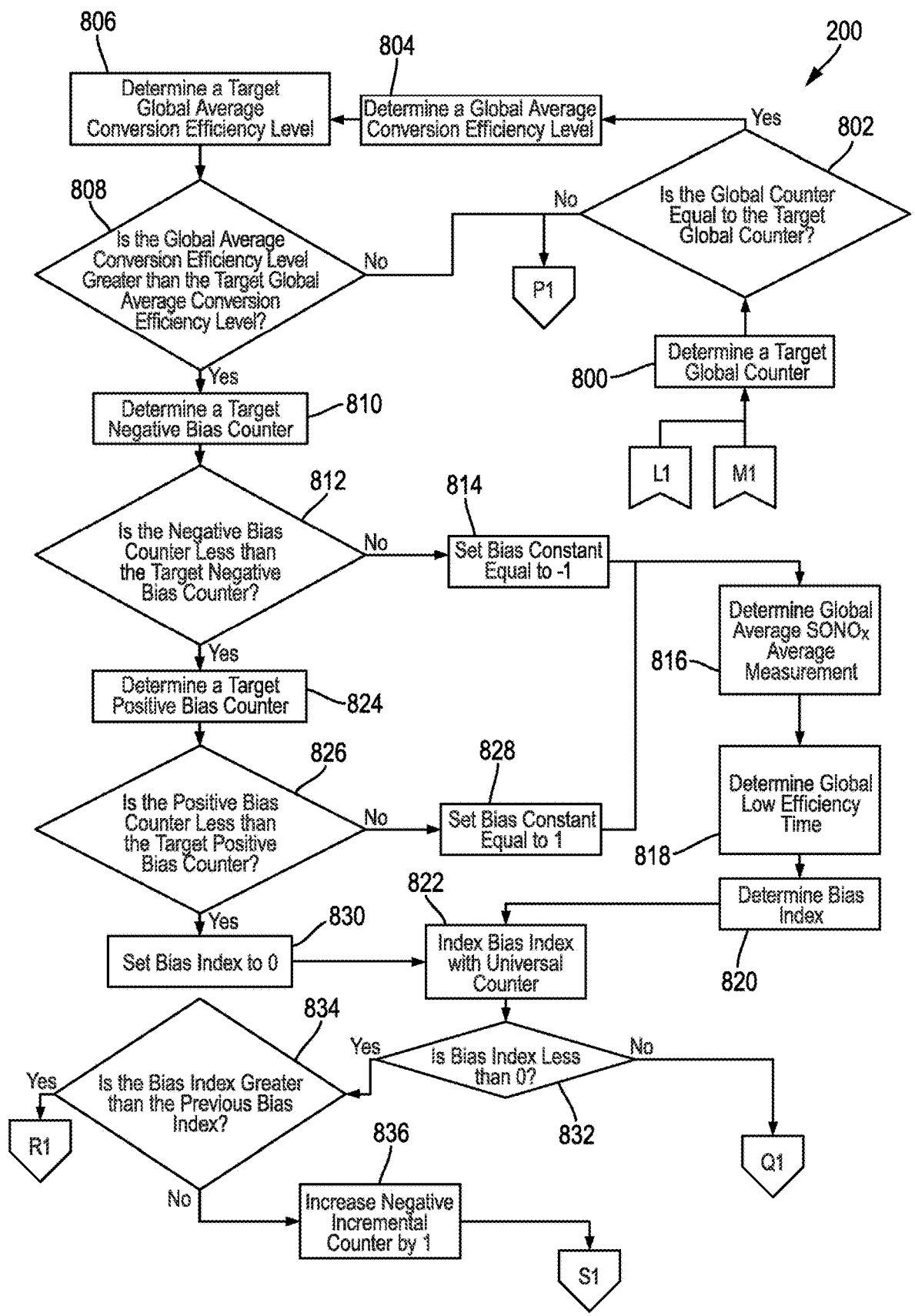
Figure 9:
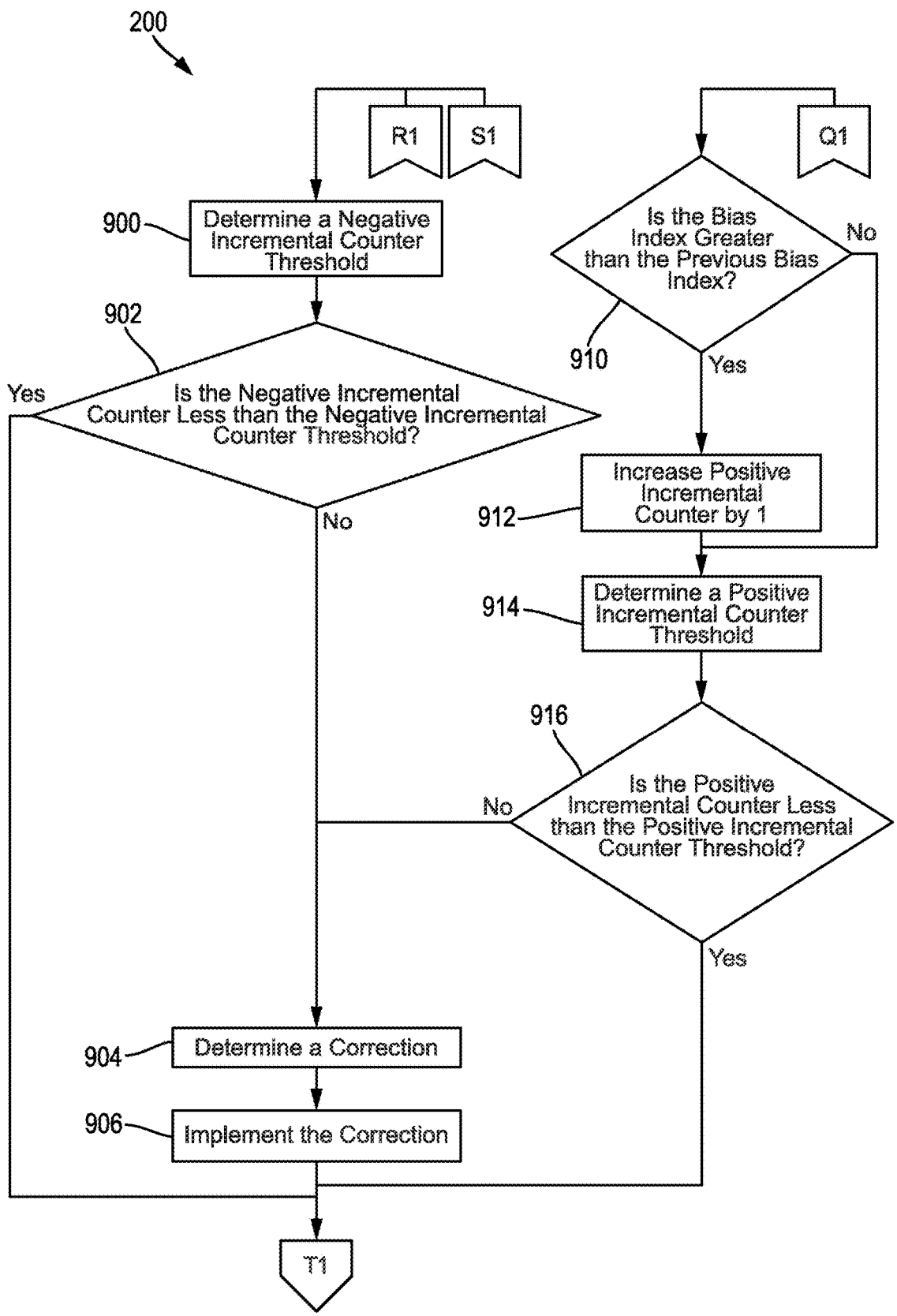
Figure 10:
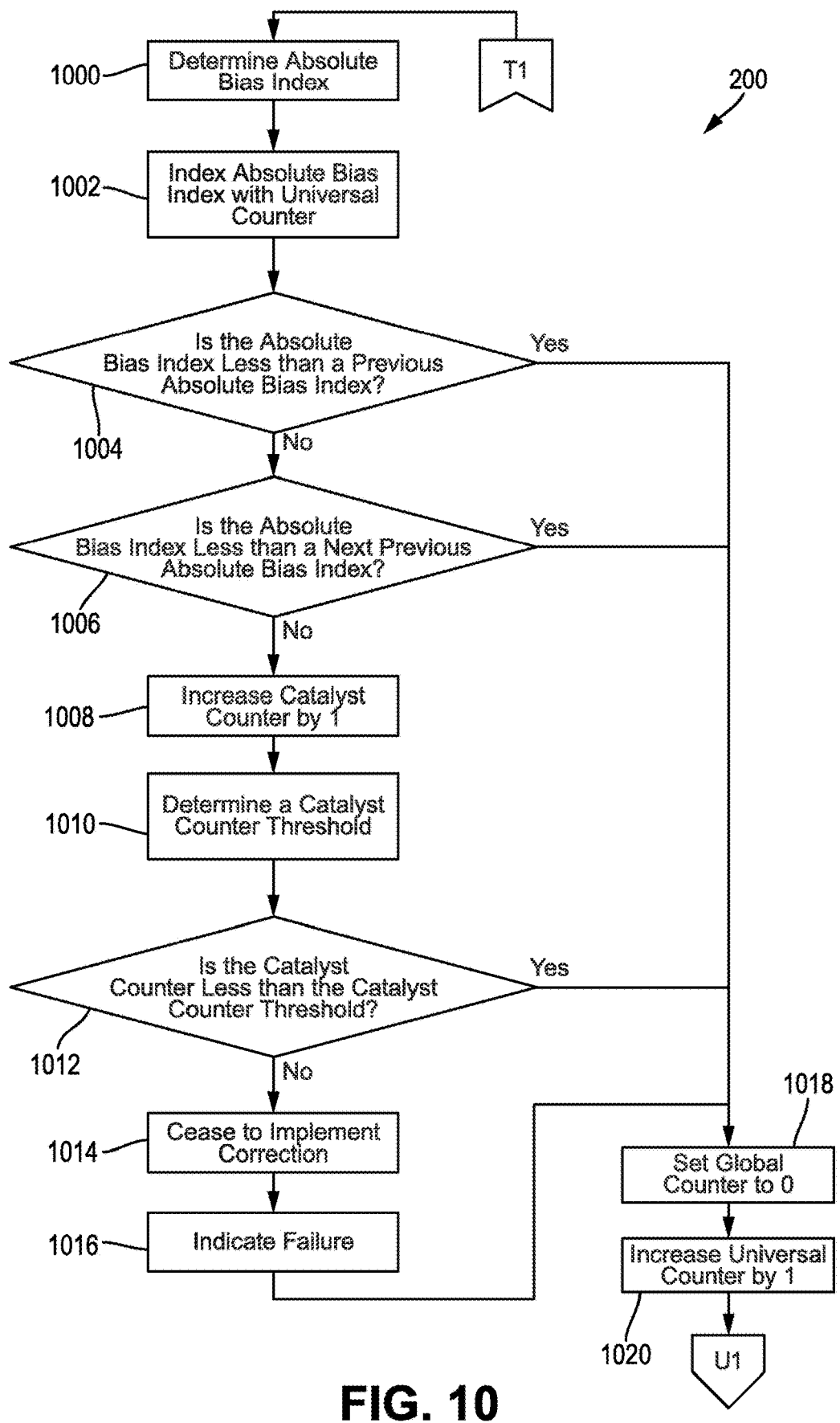

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for implementing corrections to a reductant delivery system in an exhaust aftertreatment system of an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a dosing module within an exhaust aftertreatment system. A dosing module typically treats exhaust gases using a reductant. The reductant is adsorbed by a catalyst. The adsorbed reductant in the catalyst functions to reduce $NO_x$ in the exhaust gases. Therefore, the amount of reductant that is adsorbed in the catalyst must be maintained at an acceptable level in order for the catalyst to continue to reduce $NO_x$ in the exhaust gases.

The dosing module typically provides the reductant into the exhaust gases based on a measurement of $NO_x$ exiting the system (e.g., the $NO_x$ provided to atmosphere by the system). When this measurement increases, the dosing module increases the amount of reductant provided to the exhaust gases. Conversely, when this measurement decreases, the dosing module decreases the amount of reductant provided to the exhaust gases. In some instances, this measurement can be inaccurate and therefore can cause the dosing module to provide more or less reductant than is needed to reduce $NO_x$ in the exhaust gases to a desired level.

As a result of providing too much reductant, the catalyst can become saturated and unable to adsorb additional reductant. When the catalyst is saturated, the reductant may slip from the catalyst and be sensed by the sensor as $NO_x$ in the exhaust gases, thereby distorting the measurement obtained by the sensor. As a result, the dosing module may provide additional reductant to the exhaust gases or may indicate that the catalyst has failed (e.g., is no longer capable of desirably reducing $NO_x$). This may cause premature servicing and/or replacement of the catalyst and represents a substantial cost to an owner and/or warrantor of the exhaust aftertreatment system.

Additionally, the increased consumption of reductant results in inefficiency in the use of the reductant by the exhaust aftertreatment system and causes the exhaust aftertreatment system to initiate more burn-off cycles than otherwise would occur. Burn-off cycles are used by an exhaust aftertreatment system to burn off reductant that is adsorbed in the catalyst by providing hotter exhaust gases to the catalyst. To provide these hotter exhaust gases, the internal combustion engine consumes additional fuel. Therefore, the increased consumption of reductant results in inefficiency in the use of the fuel by the internal combustion engine.

As a result of providing too little reductant, the dosing module may not have adsorbed enough reductant to be capable of desirably reducing $NO_x$ in the exhaust gases. In some instances, such as when the amount of $NO_x$ being received by the catalyst is low, the measurement read by the sensor may indicate a desirable reduction in $NO_x$ when, in fact, the $NO_x$ has not been desirably reduced. This may cause the exhaust aftertreatment system to emit more $NO_x$ than desired.

Implementations described herein relate to an exhaust aftertreatment system that includes a catalyst, a first sensor configured to obtain a $NO_x$ measurement upstream of the catalyst, a second sensor configured to obtain a $NO_x$ measurement downstream of the catalyst, a reductant pump, a reductant delivery system, and a reductant delivery system controller. The reductant delivery system controller is capable of receiving, storing, and comparing the $NO_x$ measurements from the sensors to determine if the catalyst is saturated (e.g., has adsorbed a maximum amount of reductant), has not adsorbed enough reductant to be able to convert $NO_x$ desirably, or if the catalyst is failed. Based on these determinations, the reductant delivery system controller is able to adjust an amount of reductant that is provided in order to substantially prevent saturation of the catalyst while ensuring that the catalyst has adsorbed enough reductant to be able to convert $NO_x$ desirably. In this way, the exhaust aftertreatment system is able to minimize the likelihood that a catalyst will be inaccurately indicated as failed, thereby reducing cost to the owner or warrantor, while minimizing reductant and fuel consumption. As a result, the exhaust aftertreatment system described herein is significantly more desirable than other systems which are not able of determining if too much or too little reductant is being provided due to inaccurate $NO_x$ measurements.

II. Overview of Exhaust Aftertreatment System

FIG. 1 depicts an exhaust aftertreatment system 100 having an example reductant delivery system 102 for an exhaust conduit system 104. The exhaust aftertreatment system 100 includes a particulate filter (e.g., a diesel particulate filter (DPF)) 106, the reductant delivery system 102, a decomposition chamber 108 (e.g., reactor, reactor pipe, etc.), a SCR catalyst 110, and an engine-out $NO_x$ ($EONO_x$) sensor 111, a system-out $NO_x$ ($SONO_x$) sensor 112, and a catalyst temperature sensor 113.

The DPF 106 is configured to (e.g., structured to, able to, etc.) remove particulate matter, such as soot, from exhaust gas flowing in the exhaust conduit system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust conduit system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust conduit system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly configured to communicate with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a reductant filter 122. The reductant filter 122 filters (e.g., strains, etc.) the reductant prior to the reductant being provided to internal components (e.g., pistons, vanes, etc.) of the reductant pump 120. For example, the reductant filter 122 may inhibit or prevent the transmission of solids (e.g., solidified reductant, contaminants, etc.) to the internal components of the reductant pump 120. In this way, the reductant filter 122 may facilitate prolonged desirable operation of the reductant pump 120. In some embodiments, the reductant pump 120 is coupled to a chassis of a vehicle associated with the exhaust aftertreatment system 100.

The dosing module 114, the $EONO_x$ sensor 111, the $SONO_x$ sensor 112, the catalyst temperature sensor 113, and the reductant pump 120 are also electrically or communicatively coupled to a reductant delivery system controller 124. The reductant delivery system controller 124 is configured to control the dosing module 114 to dose the reductant into the decomposition chamber 108. The reductant delivery system controller 124 may also be configured to control the reductant pump 120.

The reductant delivery system controller 124 includes a processing circuit 126. The processing circuit 126 includes a processor 128 and a memory 130. The processor 128 may include a microprocessor, an application-specific integrated circuit (ASIC), a field-programmable gate array (FPGA), etc., or combinations thereof. The memory 130 may include, but is not limited to, electronic, optical, magnetic, or any other storage or transmission device capable of providing a processor, ASIC, FPGA, etc. with program instructions. This memory 130 may include a memory chip, Electrically Erasable Programmable Read-Only Memory (EEPROM), Erasable Programmable Read Only Memory (EPROM), flash memory, or any other suitable memory from which the reductant delivery system controller 124 can read instructions. The instructions may include code from any suitable programming language. The memory 130 may include various modules that include instructions which are configured to be implemented by the processor 128.

The reductant delivery system controller 124 is configured to communicate with a central controller 132 (e.g., engine control unit (ECU)), engine control module (ECM), etc.) of an internal combustion engine having the exhaust aftertreatment system 100. In some embodiments, the central controller 132 and the reductant delivery system controller 124 are integrated into a single controller.

The central controller 132 is communicable with a display device 134 (e.g., screen, monitor, touch screen, heads up display (HUD), indicator light, etc.). The display device 134 is configured to change state in response to receiving information from the central controller 132. For example, the display device 134 may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 132. By changing state, the display device 134 may provide an indication to a user (e.g., operator, etc.) of a status (e.g., operation, in need of service, etc.) of the reductant delivery system 102.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust conduit system 104.

The exhaust aftertreatment system 100 may further include an oxidation catalyst (e.g., a diesel oxidation catalyst (DOC)) in fluid communication with the exhaust conduit system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger or upstream of a turbocharger.

The $EONO_x$ sensor 111 may be coupled to the exhaust conduit system 104 to detect a condition of the exhaust gas flowing through the exhaust conduit system 104 downstream of the internal combustion engine associated with the exhaust conduit system 104 and upstream of the DPF 106. In some implementations, the $EONO_x$ sensor 111 may have a portion disposed within the exhaust conduit system 104; for example, a tip of the $EONO_x$ sensor 111 may extend into a portion of the exhaust conduit system 104. In other implementations, the $EONO_x$ sensor 111 may receive exhaust gas through another conduit, such as one or more sample pipes extending from the exhaust conduit system 104.

The $SONO_x$ sensor 112 may be coupled to the exhaust conduit system 104 to detect a condition of the exhaust gas flowing through the exhaust conduit system 104 downstream of the SCR catalyst 110. In some implementations, the $SONO_x$ sensor 112 may have a portion disposed within the exhaust conduit system 104; for example, a tip of the $SONO_x$ sensor 112 may extend into a portion of the exhaust conduit system 104. In other implementations, the $SONO_x$ sensor 112 may receive exhaust gas through another conduit, such as one or more sample pipes extending from the exhaust conduit system 104.

The $EONO_x$ sensor 111 is configured to measure a $EONO_x$ measurement for the exhaust aftertreatment system 100 and the $SONO_x$ sensor 112 is configured to measure a $SONO_x$ measurement for the exhaust aftertreatment system 100. The $EONO_x$ measurement for the exhaust aftertreatment system 100 is a measurement of the amount of $NO_x$ (e.g., in parts per million, etc.) in the exhaust provided to the exhaust aftertreatment system 100 by the internal combustion engine. The $SONO_x$ measurement for the exhaust aftertreatment system 100 is a measurement of the amount of $NO_x$ in the exhaust provided by the exhaust aftertreatment system 100 into atmosphere.

The $EONO_x$ sensor 111 and the $SONO_x$ sensor 112 are each independently operable between an operational state (e.g., valid state, functioning state, etc.) and a non-operational state (e.g., invalid state, malfunctioning state, etc.). When the $EONO_x$ sensor 111 and/or the $SONO_x$ sensor 112 are in the operational state, $NO_x$ measurements are obtained in a normal fashion. However, when the $EONO_x$ sensor 111 and/or the $SONO_x$ sensor 112 is in the non-operational state, $NO_x$ measurements are not obtained in a normal fashion. When the $EONO_x$ sensor 111 and/or the $SONO_x$ sensor 112 is in the non-operational state, the reductant delivery system controller 124 is configured to change a state of the display device 134 to instruct an operator to service the $EONO_x$ sensor 111 and/or the $SONO_x$ sensor 112.

As is explained in more detail below, the reductant delivery system controller 124 is configured to variously interact with the reductant delivery system 102 and the central controller 132 to change a state of the display device 134. For example, where the comparison performed by the reductant delivery system controller 124 indicates that the $SONO_x$ measurement exceeds the $NO_x$ target emission, the central controller 132 may cause the display device 134 to display an alert to a user indicating that service of the reductant delivery system 102 is needed.

The exhaust aftertreatment system 100 may be configured to maintain the $SONO_x$ measurement below a target $SONO_x$ emission amount. The target $SONO_x$ emission amount may be, for example, a maximum $NO_x$ emission amount permitted under local environmental regulations. The reductant delivery system controller 124 is configured to store the target $NO_x$ emission amount and to compare the $NO_x$ target emission amount to the $SONO_x$ measurement. The comparison may be performed by the reductant delivery system controller 124 in a substantially continuous fashion (e.g., every second, etc.) or periodically (e.g., every five seconds, every minute, every five minutes, every ten minutes, every hour, etc.).

While the $EONO_x$ sensor 111 is depicted as positioned upstream of the DPF 106, it should be understood that the $EONO_x$ sensor 111 may be positioned at any other position of the exhaust conduit system 104, within the DPF 106, between the DPF 106 and the decomposition chamber 108, or within the decomposition chamber 108. In addition, two or more $EONO_x$ sensors 111 may be utilized for detecting a condition of the exhaust gas, such as two, three, four, five, or six $EONO_x$ sensors 111 with each $EONO_x$ sensor 111 located at one of the aforementioned positions of the exhaust conduit system 104.

While the $SONO_x$ sensor 112 is depicted as positioned downstream of the SCR catalyst 110, it should be understood that the $SONO_x$ sensor 112 may be positioned at any other position of the exhaust conduit system 104, within the decomposition chamber 108, between the decomposition chamber 108 and the SCR catalyst 110, within the SCR catalyst 110, or downstream of the SCR catalyst 110. In addition, two or more $SONO_x$ sensors 112 may be utilized for detecting a condition of the exhaust gas, such as two, three, four, five, or six $SONO_x$ sensors 112 with each $SONO_x$ sensor 112 located at one of the aforementioned positions of the exhaust conduit system 104.

The catalyst temperature sensor 113 is configured to measure a temperature of the SCR catalyst 110. For example, the catalyst temperature sensor 113 may measure a temperature of a catalyst bed of the SCR catalyst 110. The reductant delivery system controller 124 is configured to compare the temperature of the SCR catalyst 110 to a target temperature range of the SCR catalyst 110 to determine (e.g., compute, calculate, etc.) if the SCR catalyst 110 has a temperature that is outside of the target temperature range (e.g., the SCR catalyst 110 has a temperature that exceeds a target maximum temperature for the SCR catalyst 110, the SCR catalyst 110 has a temperature that does not exceed a target minimum temperature for the SCR catalyst 110, etc.). The target temperature range may be associated with temperatures where the SCR catalyst 110 performs optimal $NO_x$ reduction.

The catalyst temperature sensor 113 is operable between an operational state (e.g., valid state, functioning state, etc.) and a non-operational state (e.g., invalid state, malfunctioning state, etc.). When the catalyst temperature sensor 113 is in the operational state, temperature measurements of the SCR catalyst 110 are obtained in a normal fashion. However, when the catalyst temperature sensor 113 is in the non-operational state, temperature measurements of the SCR catalyst 110 are not obtained in a normal fashion. When the catalyst temperature sensor 113 is in the non-operational state, the reductant delivery system controller 124 is configured to change a state of the display device 134 to instruct an operator to service the catalyst temperature sensor 113.

The dosing module 114 includes a dosing lance assembly 136. The dosing lance assembly 136 includes a delivery conduit (e.g., delivery pipe, delivery hose, etc.). The delivery conduit is fluidly coupled to the reductant pump 120. The dosing lance assembly 136 includes at least one injector 138. The injector 138 is configured to dose the reductant into the exhaust gases (e.g., within the decomposition chamber 108, etc.). While not shown, it is understood that the dosing module 114 may include a plurality of injectors 138.

In some embodiments, the reductant delivery system 102 also includes an air pump 140. In these embodiments, the air pump 140 draws air from an air source 142 (e.g., air intake, etc.). Additionally, the air pump 140 provides the air to the dosing module 114 via a conduit. In these embodiments, the dosing module 114 is configured to mix the air and the reductant into an air-reductant mixture and to provide the air-reductant mixture into the decomposition chamber 108. In other embodiments, the reductant delivery system 102 does not include the air pump 140 or the air source 142. In such embodiments, the dosing module 114 is not configured to mix the reductant with air.

III. Example Reductant Delivery System Control Strategy

FIG. 2-10 illustrate a reductant delivery system control strategy 200. The reductant delivery system control strategy 200 is implemented in the exhaust aftertreatment system 100. Specifically, the reductant delivery system control strategy 200 is implemented by the reductant delivery system controller 124 and utilizes inputs from the $EONO_x$ sensor 111 and the $SONO_x$ sensor 112 to control operation of the reductant pump 120.

In normal operation of the exhaust aftertreatment system 100, where the reductant delivery system 102 is dosing a correct amount of reductant to the exhaust gases (e.g., as opposed to dosing too much reductant or too little reductant, etc.), a $EONO_x$ measurement ($M_{EONOx}$), obtained from the $EONO_x$ sensor 111, and a SONOx measurement ($M_{SONOx}$), obtained from the SONOx sensor 112, generally change together (e.g., increases in the $EONO_x$ measurement ($M_{EONOx}$) generally correspond to increases in the $SONO_x$ measurement ($M_{SONOx}$), and decreases in the $EONO_x$ measurement ($M_{EONOx}$) generally correspond to decreases in the $SONO_x$ measurement ($M_{SONOx}$)). The reductant delivery system control strategy 200 operates to detect instances where the SONOx measurement ($M_{SONOx}$) changes more or less than it should in order to determine if the reductant delivery system 102 is dosing too much reductant or too little reductant, and then operates to correct the amount of reductant the reductant delivery system 102 is dosing to prevent any over-dosing or under-dosing.

The SCR catalyst 110 adsorbs the reductant to convert $NO_x$ into nitrogen ($N_2$), carbon dioxide ($CO_2$), and water ($H_2O$), thereby reducing the $SONO_x$ measurement ($M_{SONOx}$) as opposed to if the SCR catalyst were not included in the exhaust aftertreatment system 100. The SCR catalyst 110 is defined by a storage capacity beyond which the SCR catalyst 110 can no longer substantively adsorb the reductant (e.g., the SCR catalyst 110 can only adsorb so much reductant) and therefore can no longer desirably convert $NO_x$ into nitrogen ($N_2$), carbon dioxide ($CO_2$), and water ($H_2O$) (e.g., the SCR catalyst 110 can only convert so much $NO_x$ into nitrogen ($N_2$), carbon dioxide ($CO_2$), and water ($H_2O$)). Furthermore, if a catalyst has not adsorbed enough reductant, the catalyst may not be able to desirably convert $NO_x$ into nitrogen ($N_2$), carbon dioxide ($CO_2$), and water ($H_2O$). Therefore, it is important to ensure that a catalyst has both adsorbed enough reductant so as to be able to convert $NO_x$ into nitrogen ($N_2$), carbon dioxide ($CO_2$), and water ($H_2O$) while not adsorbing too much reductant so as to be unable to adsorb additional reductant. The reductant delivery system control strategy 200 operates to prevent under-dosing, so that the SCR catalyst is capable of converting $NO_x$ into nitrogen ($N_2$), carbon dioxide ($CO_2$), and water ($H_2O$), and over-dosing, so that the SCR catalyst 110 is capable of adsorbing additional reductant.

During the reductant delivery system control strategy 200, various abort conditions are capable of immediately terminating the reductant delivery system control strategy 200. The abort conditions for the reductant delivery system control strategy 200 may include, for example, detecting, by the reductant delivery system controller 124, a failure of the reductant pump 120, a failure of the reductant filter 122, a failure of the reductant source 118, a failure of the $EONO_x$ sensor 111, a failure of the SONO$_x$ sensor 112, a lack of reductant in the reductant source 118 (e.g., a reductant tank is empty, etc.), a leak in a conduit, and other similar conditions.

The reductant delivery system control strategy 200 begins in block 202 with setting, by the reductant delivery system controller 124, a global counter (G), a positive bias counter (P), a negative bias counter (N), a catalyst counter (K), a low conversion efficiency level counter (A), a positive incremental counter (α), and a negative incremental counter (β) to zero. Block 202 may be represented by the following equations:

$$G=0 \quad (1)$$

$$P=0 \quad (2)$$

$$N=0 \quad (3)$$

$$K=0 \quad (4)$$

$$A=0 \quad (5)$$

$$\alpha=0 \quad (6)$$

$$\beta=0 \quad (7)$$

The reductant delivery system control strategy 200 continues in block 203 with setting, by the reductant delivery system controller 124, a universal counter (Ω) to 1. Block 203 may be represented by the following equation:

$$\Omega=1 \quad (8)$$

The reductant delivery system control strategy 200 continues in block 204 with setting a local counter (c) to zero as shown in the following equation:

$$c=0 \quad (9)$$

The global counter (G), positive bias counter (P), negative bias counter (N), catalyst counter (K), and local counter (c) are utilized by the reductant delivery system controller 124 to catalogue consecutive iterations (e.g., operations, executions, etc.) of the reductant delivery system control strategy 200 such that an instant iteration of the reductant delivery system control strategy 200 can be compared to a previous, or a series of previous, iterations of the reductant delivery system control strategy 200.

The reductant delivery system control strategy 200 continues with a functionality verification test 206. The functionality verification test begins in block 208 with determining, by the reductant delivery system controller 124, if the EONO$_x$ sensor 111 is in the functional state. If the EONO$_x$ sensor 111 is not in the functional state (e.g., the EONO$_x$ sensor 111 is in the non-functional state), the reductant delivery system control strategy 200 continues in block 210 with causing, by the reductant delivery system controller 124, the display device 134 to display an error indicating that service of the EONO$_x$ sensor 111 is needed (e.g., a message stating "SERVICE OF ENGINE-OUT NO$_x$ SENSOR REQUIRED," etc.). Thereafter, the reductant delivery system control strategy 200 continues with block 208. This causes the reductant delivery system control strategy 200 to wait until the EONO$_x$ sensor 111 has been serviced and is in the functional state before proceeding. However, it is understood that in some embodiments the reductant delivery system control strategy 200 may continue (e.g., after waiting a target amount of time for service to be performed, etc.) despite the EONOx sensor 111 being in the non-functional state.

If the EONO$_x$ sensor 111 is in the functional state in block 208, the functionality verification test 206 continues in block 212 with determining, by the reductant delivery system controller 124, if the SONO$_x$ sensor 112 is in the functional state. If the SONO$_x$ sensor 112 is not in the functional state (e.g., the SONO$_x$ sensor 112 is in the non-functional state), the reductant delivery system control strategy 200 continues in block 214 with causing, by the reductant delivery system controller 124, the display device 134 to display an error indicating that service of the SONO$_x$ sensor 112 is needed (e.g., a message stating "SERVICE OF SYSTEM-OUT NO$_x$ SENSOR REQUIRED," etc.). Thereafter, the reductant delivery system control strategy 200 continues with block 208. This causes the reductant delivery system control strategy 200 to wait until the SONOx sensor 112 has been serviced and is in the functional state before proceeding. However, it is understood that in some embodiments the reductant delivery system control strategy 200 may continue (e.g., after waiting a target amount of time for service to be performed, etc.) despite the SONOx sensor 112 being in the non-functional state.

If the SONO$_x$ sensor 112 is in the functional state in block 212, the functionality verification test 206 continues in block 216 with determining, by the reductant delivery system controller 124, if the catalyst temperature sensor 113 is in the functional state. If the catalyst temperature sensor 113 is not in the functional state (e.g., the catalyst temperature sensor 113 is in the non-functional state), the reductant delivery system control strategy 200 continues in block 218 with causing, by the reductant delivery system controller 124, the display device 134 to display an error indicating that service of the catalyst temperature sensor 113 is needed (e.g., a message stating "SERVICE OF CATALYST TEMPERATURE SENSOR REQUIRED," etc.).

Thereafter, the reductant delivery system control strategy 200 continues with block 208. This causes the reductant delivery system control strategy 200 to wait until the catalyst temperature sensor 113 has been serviced and is in the functional state before proceeding. However, it is understood that in some embodiments the reductant delivery system control strategy 200 may continue (e.g., after waiting a target amount of time for service to be performed, etc.) despite the catalyst temperature sensor 113 being in the non-functional state.

If the catalyst temperature sensor 113 is in the functional state in block 216, the functionality verification test 206 continues in block 220 with determining, by the reductant delivery system controller 124, if the catalyst temperature (T$_{catalyst}$) catalyst temperature sensor 113 is within a target temperature range between a target maximum catalyst temperature (T$_{max}$) and a target minimum catalyst temperature (T$_{min}$). Block 220 may be represented by the following equations, only one of which can be true at any given time:

$$T_{min} < T_{catalyst} < T_{max} \quad (10)$$

$$T_{catalyst} \leq T_{min} \quad (11)$$

$$T_{max} \leq T_{catalyst} \quad (12)$$

If the catalyst temperature is not within the target temperature range (e.g., either Equation (11) or (12) is true, etc.), the reductant delivery system control strategy 200 continues in block 222 with causing, by the reductant delivery system controller 124, the display device 134 to display an error indicating that the catalyst temperature is not within the target temperature range (e.g., a message stating "CATALYST TEMPERATURE NOT WITHIN RANGE," a message stating "CATALYST TEMPERATURE TOO HIGH," a message stating "CATALYST TEMPERATURE TOO LOW," etc.). Thereafter, the reductant delivery system control strategy 200 continues with block 208. This causes the reductant delivery system control strategy 200 to wait until the catalyst temperature is within the target temperature range before proceeding. However, it is understood that in some embodiments the reductant delivery system control strategy 200 may continue (e.g., after waiting a target amount of time for the catalyst temperature to be within the target temperature range, etc.) despite the catalyst temperature not being within the target temperature range.

If the catalyst temperature is within the target temperature range in block 220, the functionality verification test 206 continues in block 224 with computing, by the reductant delivery system controller 124, a conversion efficiency (CE) by subtracting the $SONO_x$ measurement ($M_{SONOx}$) from the $EONO_x$ measurement ($M_{EONOx}$), dividing by the $EONO_x$ measurement ($M_{EONOx}$), and multiplying by 100%. Block 224 may be represented by the following equation:

$$CE = \left(\frac{M_{EONO_x} - M_{SONO_x}}{M_{EONO_x}}\right) * 100\% \quad (13)$$

The functionality verification test 206 continues in block 226 with determining, by the reductant delivery system controller 124, if the conversion efficiency (CE) catalyst temperature sensor 113 is within a target conversion efficiency range between a target maximum conversion efficiency ($CE_{max}$) and a target minimum conversion efficiency ($CE_{min}$). Block 226 may be represented by the following equations, only one of which can be true at any given time:

$$CE_{min} < CE < CE_{max} \quad (14)$$

$$CE \leq CE_{min} \quad (15)$$

$$CE_{max} \leq CE \quad (16)$$

The target maximum conversion efficiency ($CE_{max}$) may be associated with a conversion efficiency (CE) that occurs when the SCR catalyst 110 has no, or almost no, ability to store any additional byproducts of chemical reactions between the reductant and the exhaust gases. This may occur when the SCR catalyst 110 has become saturated and needs to be replaced in order for the exhaust aftertreatment system 100 to continue to operate desirably. The target minimum conversion efficiency ($CE_{min}$) may be associated with a conversion efficiency (CE) that occurs when the SCR catalyst 110 has a leak or otherwise lacks the ability to store any substantive amount of the byproducts of chemical reactions between the reductant and the exhaust gases. This may occur when the SCR catalyst 110 fails (e.g., a portion of the SCR catalyst 110 becomes dislodged and creates a pathway through the SCR catalyst 110, etc.) and needs to be replaced in order for the exhaust aftertreatment system 100 to continue to operate desirably.

If the conversion efficiency (CE) is not within the target conversion efficiency (CE) range (e.g., either Equation (15) or (16) is true, etc.), the reductant delivery system control strategy 200 continues in block 228 with causing, by the reductant delivery system controller 124, the display device 134 to display an error indicating that the service of the SCR catalyst 110 is needed (e.g., a message stating "SERVICE CATALYST," etc.). Thereafter, the reductant delivery system control strategy 200 continues with block 208. This causes the reductant delivery system control strategy 200 to wait until the SCR catalyst 110 has been serviced before proceeding. However, it is understood that in some embodiments the reductant delivery system control strategy 200 may continue (e.g., after waiting a target amount of time for the catalyst to be serviced, etc.) despite the conversion efficiency (CE) not being within the target conversion efficiency (CE) range.

If the conversion efficiency (CE) is not within the target conversion efficiency (CE) range (e.g., Equation (14) is true, etc.), the functionality verification test 206 ends and the reductant delivery system control strategy 200 continues in block 300 with increasing, by the reductant delivery system controller 124, the local counter (c) by one.

The reductant delivery system control strategy 200 continues in block 304 with indexing, by the reductant delivery system controller 124, the $EONO_x$ measurement ($M_{EONOx}$), obtained from the $EONO_x$ sensor 111, with the local counter (c). This indexing produces a locally-indexed $EONO_x$ measurement ($M_{EONOx, c}$) having two components: one being the $EONO_x$ measurement ($M_{EONOx}$) and the other being the local counter (c). A listing of a portion of the locally-indexed $EONO_x$ measurements ($M_{EONOx, c}$), according to some embodiments, is shown in Table 1 below.

TABLE 1

Listing of a Portion of the Locally-Indexed $EONO_x$ Measurements ($M_{EONOx,c}$)

| Locally-Indexed $EONO_x$ Measurement ($M_{EONOx,c}$) | $EONO_x$ Measurement ($M_{EONOx}$) | Local Counter (c) |
|---|---|---|
| N/A | N/A | 0 |
| $M_{EONOx,1}$ | AA | 1 |
| $M_{EONOx,2}$ | BB | 2 |
| $M_{EONOx,3}$ | CC | 3 |
| $M_{EONOx,4}$ | DD | 4 |
| . | . | . |
| . | . | . |
| . | . | . |

The reductant delivery system control strategy 200 continues in block 310 with indexing, by the reductant delivery system controller 124, the $SONO_x$ measurement ($M_{SONOx}$), obtained from the $SONO_x$ sensor 112, with the local counter (c). This indexing produces a locally-indexed $SONO_x$ measurement ($M_{SONOx, c}$) having two components: one being the $SONO_x$ measurement ($M_{SONOx}$) and the other being the local counter (c). A listing of a portion of the locally-indexed $SONO_x$ measurements ($M_{SONOx, c}$), according to some embodiments, is shown in Table 2 below.

TABLE 2

Listing of a Portion of the Locally-Indexed $SONO_x$ Measurements ($M_{SONOx,c}$)

| Locally-Indexed $SONO_x$ Measurement ($M_{SONOx,c}$) | $SONO_x$ Measurement ($M_{SONOx}$) | Local counter (c) |
|---|---|---|
| N/A | N/A | 0 |
| $M_{SONOx,1}$ | EE | 1 |
| $M_{SONOx,2}$ | FF | 2 |
| $M_{SONOx,3}$ | GG | 3 |
| $M_{SONOx,4}$ | HH | 4 |
| . | . | . |
| . | . | . |
| . | . | . |

The reductant delivery system control strategy 200 continues in block 312 with computing, by the reductant delivery system controller 124, a SONOx differential ($d_{SONOx}$) by subtracting a $SONO_x$ measurement ($M_{SONOx,\ c-1}$) for the previous local counter (e.g., local counter-1) from the $SONO_x$ measurement ($M_{SONOx,\ c}$) for the local counter. Block 312 may be represented by the following equation:

$$d_{SONO_x,c} = M_{SONO_x,c} - M_{SONO_x,c-1} \quad (17)$$

The reductant delivery system control strategy 200 continues in block 314 with indexing, by the reductant delivery system controller 124, the $SONO_x$ differential ($d_{SONOx}$) with the local counter (c). This indexing produces a locally-indexed $SONO_x$ differential ($d_{SONOx,\ c}$) having two components: one being the $SONO_x$ differential ($d_{SONOx}$) and the other being the local counter (c). A listing of a portion of the locally-indexed $SONO_x$ differentials ($d_{SONOx,\ c}$), according to some embodiments, is shown in Table 3 below.

TABLE 3

Listing of a Portion of the Locally-Indexed $SONO_x$ Differentials ($d_{SONOx,c}$)

| Locally-Indexed $SONO_x$ Differential ($d_{SONOx,c}$) | Locally-Indexed $SONO_x$ Measurement ($M_{SONOx,c}$) | $SONO_x$ Measurement ($M_{SONOx}$) | $SONO_x$ Differential ($d_{SONOx}$) | Local Counter (c) |
|---|---|---|---|---|
| N/A | N/A | N/A | N/A | 0 |
| $d_{SONOx,1}$ | $M_{SONOx,1}$ | EE | N/A | 1 |
| $d_{SONOx,2}$ | $M_{SONOx,2}$ | FF | FF-EE | 2 |
| $d_{SONOx,3}$ | $M_{SONOx,3}$ | GG | GG-FF | 3 |
| $d_{SONOx,4}$ | $M_{SONOx,4}$ | HH | HH-GG | 4 |
| . | . | . | . | . |
| . | . | . | . | . |
| . | . | . | . | . |

In some embodiments, the SONOx differential ($d_{SONOx}$) is determined by subtracting a $SONO_x$ measurement ($M_{SONOx}$) for the local counter of one from the $SONO_x$ measurement ($M_{SONOx}$) for the local counter. In these embodiments, the SONOx differential ($d_{SONOx}$) is always relative to the first $SONO_x$ measurement ($M_{SONOx,\ 1}$). It is understood that other similar methodologies for computing the $SONO_x$ differential ($d_{SONOx}$) are also possible (e.g., using averages of the $SONO_x$ measurement ($M_{SONOx}$), etc.).

The reductant delivery system control strategy 200 continues in block 315 with indexing, by the reductant delivery system controller 124, the conversion efficiency (CE) with the local counter (c). This indexing produces a locally-indexed conversion efficiency ($CE_c$) having two components: one being the conversion efficiency (CE) and the other being the local counter (c). A listing of a portion of the locally-indexed conversion efficiencies ($CE_c$), according to some embodiments, is shown in Table 4 below.

TABLE 4

Listing of a Portion of the Locally-indexed Conversion Efficiencies ($CE_{local}$)

| Locally-indexed Conversion Efficiencies ($CE_c$) | Conversion Efficiency (CE) | Local Counter (c) |
|---|---|---|
| N/A | N/A | 0 |
| $CE_1$ | $\left(\frac{AA-EE}{AA}\right)*100\%$ | 1 |
| $CE_2$ | $\left(\frac{BB-FF}{BB}\right)*100\%$ | 2 |
| $CE_3$ | $\left(\frac{CC-GG}{CC}\right)*100\%$ | 3 |
| $CE_4$ | $\left(\frac{DD-HH}{DD}\right)*100\%$ | 4 |
| . | . | . |
| . | . | . |
| . | . | . |

The reductant delivery system control strategy 200 continues in block 316 with determining, by the reductant delivery system controller 124, a target local counter ($G_{target}$). The target local counter ($c_{target}$) is utilized by the reductant delivery system controller 124 to establish an "evaluation window" where a series of $EONO_x$ measurements ($M_{EONOx}$) and $SONO_x$ measurements ($M_{SONOx}$) are determined and indexed. The target local counter ($c_{target}$) is selected so that enough time elapses as to be sufficient to observe spikes (e.g., substantial increases, substantial decreases, etc.) in the $SONO_x$ measurement ($M_{SONOx}$) while mitigating the possibility of "false positives" (e.g., "noise," etc.) or increases or decreases that are not due to legitimate spikes in the $SONO_x$ measurement ($M_{SONOx}$). As will be explained in more detail herein, these spikes can be helpful in identifying whether the reductant delivery system 102 is dosing too much or too little reductant. In various embodiments, the target local counter ($c_{target}$) is selected to be equal to an amount of time necessary for the reductant delivery system 102 to stabilize (e.g., for the internal combustion engine having the aftertreatment system 100 to reach steady state, etc.). In some embodiments, the target local counter ($c_{target}$) is 10 minutes. In other embodiments, the target local counter ($c_{target}$) is 20 minutes. In other embodiments, the target local counter ($c_{target}$) is between 5 minutes and 10 minutes. The target local counter ($c_{target}$) may be stored in the reductant delivery system controller 124 and may be constant or varied over time (e.g., the reductant delivery system controller 124 may determine the target local counter ($c_{target}$) via machine learning, etc.).

The reductant delivery system control strategy 200 continues in block 317 with determining, by the reductant delivery system controller 124, if the local counter (c) is equal to the target local counter ($c_{target}$). Block 317 may be represented by the following equations, only one of which can be true at any given time:

$$c < c_{target} \quad (18)$$

$$c = c_{target} \quad (19)$$

If in block 317, the local counter (c) is less than the target local counter ($c_{target}$) (e.g., if Equation (18) is true), the reductant delivery system control strategy 200 continues with block 208.

However, if in block 317, the local counter (c) is equal to the target local counter ($c_{target}$) (e.g., if Equation (19) is true), the reductant delivery system control strategy 200 continues in block 318 with increasing, by the reductant delivery system controller 124, the global counter (G) by one. The global counter (G) is different and distinct from the local counter (c) and facilitates indexing separate from the local counter (c).

The reductant delivery system control strategy 200 continues in block 324 with computing, by the reductant delivery system controller 124, a $SONO_x$ average differential ($\Delta_{SONOx}$). The $SONO_x$ average differential ($\Delta_{SONOx}$) may be determined in a variety of fashions such that the reductant delivery system control strategy 200 is tailored for a target application.

In various embodiments, the $SONO_x$ average differential ($\Delta_{SONOx}$) is determined by averaging the $SONO_x$ differentials (dSONOx) indexed with local counters of all values (e.g., $d_{SONOx, 1}$ through $d_{SONOx, ctarget}$). Block 324 may be represented by the following equation:

$$\Delta_{SONO_x} = \frac{\sum_{i=1}^{c_{target}} d_{SONO_x, c}}{c_{target}} \quad (20)$$

The reductant delivery system control strategy 200 continues in block 326 with indexing, by the reductant delivery system controller 124, the $SONO_x$ average differential ($\Delta_{SONOx}$) with the global counter (G). This indexing produces a globally-indexed $SONO_x$ average differential ($\Delta_{SONOx, G}$) having two components: one being the $SONO_x$ average differential ($\Delta_{SONOx}$) and the other being the global counter (G). As will be explained in more detail herein, the reductant delivery system control strategy 200 can cause additional increases to the global counter (G) and therefore produce additional globally-indexed $SONO_x$ average differentials ($\Delta_{SONOx, G}$). A listing of a portion of the globally-indexed $SONO_x$ average differentials ($\Delta_{SONOx, G}$), according to some embodiments, is shown in Table 5 below.

TABLE 5

Listing of a Portion of the Globally-indexed $SONO_x$ Average Differentials ($\Delta_{SONOx,G}$)

| Globally-indexed $SONO_x$ Average Differentials ($\Delta_{SONOx,G}$) | $SONO_x$ Average Differential ($\Delta_{SONOx}$) | Global Counter (G) |
| --- | --- | --- |
| N/A | N/A | 0 |
| $\Delta_{SONOx,1}$ | MM | 1 |
| $\Delta_{SONOx,2}$ | NN | 2 |
| $\Delta_{SONOx,3}$ | PP | 3 |
| $\Delta_{SONOx,4}$ | QQ | 4 |
| . | . | . |
| . | . | . |
| . | . | . |

The reductant delivery system control strategy 200 continues in block 328 with computing, by the reductant delivery system controller 124, an $SONO_x$ average measurement (W). The $SONO_x$ average measurement (W) may be determined in a variety of fashions such that the reductant delivery system control strategy 200 is tailored for a target application.

In various embodiments, the $SONO_x$ average measurement (W) is determined by averaging the $SONO_x$ measurement ($M_{SONOx}$) indexed with local counters of all values (e.g., $M_{SONOx, 1}$ through $M_{SONOx, ctarget}$). Block 328 may be represented by the following equation:

$$W = \frac{\sum_{i=1}^{c_{target}} M_{SONO_x, c}}{c_{target}} \quad (21)$$

The reductant delivery system control strategy 200 continues in block 330 with indexing, by the reductant delivery system controller 124, the $SONO_x$ average measurement (W) with the global counter (G). This indexing produces a globally-indexed $SONO_x$ average measurement (W) having two components: one being the $SONO_x$ average measurement (W) and the other being the global counter (G). As will be explained in more detail herein, the reductant delivery system control strategy 200 increases the global counter (G) and therefore produce additional globally-indexed $SONO_x$ average measurement (W). A listing of a portion of the globally-indexed $SONO_x$ average measurement (W), according to some embodiments, is shown in Table 6 below.

TABLE 6

Listing of a Portion of the Globally-Indexed $SONO_x$ Average Measurement ($W_G$)

| Globally-indexed SONOx Average Measurement ($W_G$) | SONOx Average Measurement (W) | Global Counter (G) |
| --- | --- | --- |
| N/A | N/A | 0 |
| $W_1$ | RR | 1 |
| $W_2$ | SS | 2 |
| $W_3$ | TT | 3 |
| $W_4$ | UU | 4 |
| . | . | . |
| . | . | . |
| . | . | . |

The reductant delivery system control strategy 200 continues in block 332 with computing, by the reductant delivery system controller 124, an average conversion efficiency ($\Delta_{CE}$). The average conversion efficiency ($\Delta_{CE}$) may be determined in a variety of fashions such that the reductant delivery system control strategy 200 is tailored for a target application.

In various embodiments, the average conversion efficiency ($\Delta_{CE}$) is determined by averaging the conversion efficiencies (CE) indexed with local counters of all values (e.g., $CE_1$ through $CE_{ctarget}$). Block 332 may be represented by the following equation:

$$\Delta_{CE} = \frac{\sum_{i=1}^{c_{target}} CE_c}{c_{target}} \quad (22)$$

The reductant delivery system control strategy 200 continues in block 334 with indexing, by the reductant delivery system controller 124, the average conversion efficiency ($\Delta_{CE}$) with the global counter (G). This indexing produces a globally-indexed average conversion efficiency ($\Delta_{CE, G}$) having two components: one being the average conversion efficiency ($\Delta_{CE}$) and the other being the global counter (G). As will be explained in more detail herein, the reductant delivery system control strategy 200 can cause additional increases to the global counter (G) and therefore produce additional globally-indexed average conversion efficiencies ($\Delta_{CE, G}$). A listing of a portion of the globally-indexed average conversion efficiency ($\Delta_{CE, G}$), according to some embodiments, is shown in Table 7 below.

TABLE 7

Listing of a Portion of the Globally-indexed Average Conversion Efficiencies ($\Delta_{CE,G}$)

| Globally-indexed Average Conversion Efficiencies ($\Delta_{CE,G}$) | Average Conversion Efficiency ($\Delta_{CE}$) | Global Counter (G) |
|---|---|---|
| N/A | N/A | 0 |
| $\Delta_{CE,1}$ | VV | 1 |
| $\Delta_{CE,2}$ | XX | 2 |
| $\Delta_{CE,3}$ | YY | 3 |
| $\Delta_{CE,4}$ | ZZ | 4 |
| . | . | . |
| . | . | . |
| . | . | . |

The reductant delivery system control strategy 200 continues in block 336 with determining, by the reductant delivery system controller 124, a low conversion level efficiency threshold (J). The low conversion efficiency level threshold (J) is utilized by the reductant delivery system controller 124 to determine an amount of time, based on the global counter (G), that the exhaust aftertreatment system 100 is not efficient enough at converting $NO_x$ produced by the internal combustion engine associated with the exhaust aftertreatment system 100. The low conversion efficiency level threshold (J) may be stored in the reductant delivery system controller 124 and may be constant or varied over time (e.g., the reductant delivery system controller 124 may determine the low conversion efficiency level threshold (J) via machine learning, etc.). In various embodiments, the low conversion level efficiency threshold (J) (e.g., is not updated by the reductant delivery system control strategy 200, etc.) is static and is determined based on emissions regulation requirements. For example, the low conversion efficiency level threshold (J) may be hard-coded (e.g., written into the program without any variables, etc.). In some embodiments, servicers and/or manufacturers of the reductant delivery system 102 can update the low conversion efficiency level threshold (J) based on changes to emission regulation requirements.

The reductant delivery system control strategy 200 continues in block 338 with determining by the reductant delivery system controller 124, if average conversion efficiency ($\Delta_{CE,G}$) is less than the low conversion efficiency level threshold (J). Block 338 may be represented by the following equations, only one of which can be true at any given time:

$$\Delta_{CE,G} \geq J \qquad (23)$$

$$\Delta_{CE,G} < J \qquad (24)$$

If the reductant delivery system controller 124 determines that the average conversion efficiency ($\Delta_{CE, G}$) is not less than the low conversion efficiency level threshold (J) (e.g., if Equation (24) is true), the reductant delivery system control strategy 200 continues in block 340 with increasing, by the reductant delivery system controller 124, the low conversion efficiency level counter (A) by one. However, if the reductant delivery system controller 124 determines that the average conversion efficiency ($\Delta_{CE, G}$) is less than the low conversion efficiency level threshold (J) (e.g., if Equation (23) is true), the reductant delivery system control strategy 200 does not increase the low conversion efficiency level counter (A) by one.

Next, the reductant delivery system control strategy 200 operates to determine if the $SONO_x$ average differential ($\Delta_{SONOx, G}$) changed more or less than it should have. To do this, the reductant delivery system control strategy 200 continues in block 402 with determining, by the reductant delivery system controller 124, a $SONO_x$ spike initial threshold ($S_{SONOx, initial}$). The $SONO_x$ spike initial threshold ($S_{SONOx, initial}$) may be stored in the reductant delivery system controller 124 and may be constant or varied over time (e.g., the reductant delivery system controller 124 may determine the $SONO_x$ spike initial threshold ($S_{SONOx, initial}$) via machine learning, etc.). In various embodiments, the $SONO_x$ spike initial threshold ($S_{SONOx, initial}$) is determined by a manufacturer of the reductant delivery system 102. The manufacturer may determine the $SONO_x$ spike initial threshold ($S_{SONOx, initial}$) by testing the reductant delivery system 102 and optimizing the reductant delivery system control strategy 200 so that $NO_x$ emissions by the aftertreatment system 100 are maintained at a desirable level and such that usage of the reductant delivery system 102 is maintained at a desirable level. In one such embodiment, the $SONO_x$ spike initial threshold ($S_{SONOx, initial}$) is 20 parts per million (PPM) per second.

The reductant delivery system control strategy 200 then continues in block 404 with determining, by the reductant delivery system controller 124, if the absolute value of the $SONO_x$ average differential ($\Delta_{SONOx, G}$) for the current global counter (e.g., as opposed to a previous global counter, etc.) is greater than the $SONO_x$ spike initial threshold ($S_{SONOx, initial}$). Block 404 may be represented by the following equations, only one of which can be true at any given time:

$$|\Delta_{SONO_x,G}| > S_{SONO_x,initial} \qquad (25)$$

$$|\Delta_{SONO_x,G}| \leq S_{SONO_x,initial} \qquad (26)$$

If the absolute value of the $SONO_x$ average differential ($\Delta_{SONOx, G}$) is greater than the $SONO_x$ spike initial threshold ($S_{SONOx, initial}$) (e.g., if Equation (25) is true), the absolute value of the $SONO_x$ average differential ($\Delta_{SONOx, G}$) did not change less than it should have and the reductant delivery system control strategy 200 operates to determine if the absolute value of the $SONO_x$ average differential ($\Delta_{SONOx, G}$) changed more than it should have. To do this, the reductant delivery system control strategy 200 continues in block 406 with determining, by the reductant delivery system controller 124, a $SONO_x$ spike secondary threshold ($S_{SONOx, secondary}$). The $SONO_x$ spike secondary threshold ($S_{SONOx, secondary}$) may be stored in the reductant delivery system controller 124 and may be constant or varied over time (e.g., the reductant delivery system controller 124 may determine the $SONO_x$ spike secondary threshold ($S_{SONOx, secondary}$) via machine learning, etc.). In various embodiments, the $SONO_x$ spike second threshold ($S_{SONOx, secondary}$) is determined by a manufacturer of the reductant delivery system 102. The manufacturer may determine the $SONO_x$ spike secondary threshold ($S_{SONOx, secondary}$) by testing the reductant delivery system 102 and optimizing the reductant delivery system control strategy 200 so that $NO_x$ emissions by the aftertreatment system 100 are maintained at a desirable level and such that usage of the reductant delivery system 102 is maintained at a desirable level. In one such embodiment, the $SONO_x$ spike secondary threshold ($S_{SONOx, secondary}$) is 50 parts per million (PPM) per second.

The reductant delivery system control strategy 200 then continues in block 408 with determining, by the reductant delivery system controller 124, if the absolute value of the $SONO_x$ average differential ($\Delta_{SONOx, G}$) for the current global counter (e.g., as opposed to a previous global counter, etc.) is greater than the $SONO_x$ spike secondary threshold ($S_{SONOx, secondary}$). Block 408 may be represented by the following equations, only one of which can be true at any given time:

$$|\Delta_{SONO_x,G}| \geq S_{SONO_x,secondary} \qquad (27)$$

$$|\Delta_{SONO_x,G}| < S_{SONO_x,secondary} \qquad (28)$$

If the absolute value of the $SONO_x$ average differential ($\Delta_{SONOx, G}$) is less than the $SONO_x$ spike initial threshold ($S_{SONOx, initial}$) (e.g., if Equation (28) is true), the absolute value of the $SONO_x$ average differential ($\Delta_{SONOx, G}$) did not change more than it should have and the reductant delivery system control strategy 200 continues in block 512 with determining, by the reductant delivery system controller 124, an initial conversion efficiency level threshold ($L_{CE, initial}$). The initial conversion efficiency level threshold ($L_{CE, initial}$) may be stored in the reductant delivery system controller 124 and may be constant or varied over time (e.g., the reductant delivery system controller 124 may determine the initial conversion efficiency level threshold ($L_{CE, initial}$) via machine learning, etc.). The initial conversion efficiency level threshold ($L_{CE, initial}$) is a function of the temperature of the exhaust gases in the aftertreatment system 100 (e.g., as measured by a sensor downstream of the SCR catalyst 110, etc.) and a flow rate of the exhaust gases in the aftertreatment system 100 (e.g., as measured by a sensor downstream of the SCR catalyst 110, etc.). In various embodiments, when the temperature of the exhaust gases in the aftertreatment system 100 is 250° C., the initial conversion efficiency level threshold ($L_{CE, initial}$) is 70% and when the temperature of the exhaust gases in the aftertreatment system 100 is 300° C., the initial conversion efficiency level threshold ($L_{CE, initial}$) is 90%. In other embodiments, the initial conversion efficiency level threshold ($L_{CE, initial}$) is a bounded range, rather than a single value.

The reductant delivery system control strategy 200 then continues in block 514 with determining, by the reductant delivery system controller 124, if current average conversion efficiency ($\Delta_{CE, G}$) is less than the initial conversion efficiency level threshold ($L_{CE, initial}$). Block 514 may be represented by the following equations, only one of which can be true at any given time:

$$\Delta_{CE,G} < L_{CE,initial} \qquad (29)$$

$$\Delta_{CE,G} \geq L_{CE,initial} \qquad (30)$$

If the reductant delivery system controller 124 determines that the current average conversion efficiency ($\Delta_{CE, G}$) is less than the initial conversion efficiency level threshold ($L_{CE, initial}$) (e.g., if Equation (29) is true), then the reductant delivery system control strategy 200 continues in block 516 with determining, by the reductant delivery system controller 124, a secondary conversion efficiency level threshold ($L_{CE, secondary}$). The secondary conversion efficiency level threshold ($L_{CE, secondary}$) is different and distinct from the initial conversion efficiency level threshold ($L_{CE, initial}$). The secondary conversion efficiency level threshold ($L_{CE, secondary}$) may be stored in the reductant delivery system controller 124 and may be constant or varied over time (e.g., the reductant delivery system controller 124 may determine the secondary conversion efficiency level threshold ($L_{CE, secondary}$) via machine learning, etc.). The secondary conversion efficiency level threshold ($L_{CE, secondary}$) is a function of the temperature of the exhaust gases in the aftertreatment system 100 (e.g., as measured by a sensor downstream of the SCR catalyst 110, etc.) and a flow rate of the exhaust gases in the aftertreatment system 100 (e.g., as measured by a sensor downstream of the SCR catalyst 110, etc.). In various embodiments, when the temperature of the exhaust gases in the aftertreatment system 100 is 250° C., the secondary conversion efficiency level threshold ($L_{CE, secondary}$) is 10% and when the temperature of the exhaust gases in the aftertreatment system 100 is 300° C., the secondary conversion efficiency level threshold ($L_{CE, secondary}$) is 20%. In other embodiments, the secondary conversion efficiency level threshold ($L_{CE, secondary}$) is equal to the product of the initial conversion efficiency level threshold ($L_{CE, initial}$) and a constant. In such embodiments, the secondary conversion efficiency level threshold ($L_{CE, secondary}$) is a percentage (e.g., a minimum percentage) of the initial conversion efficiency level threshold ($L_{CE, initial}$). In other embodiments, the secondary conversion efficiency level threshold ($L_{CE, secondary}$) is a fixed value that is not a function of the initial conversion efficiency level threshold ($L_{CE, initial}$). In other embodiments, the secondary conversion efficiency level threshold ($L_{CE, secondary}$) is a bounded range, rather than a single value.

The reductant delivery system control strategy 200 then continues in block 518 with determining, by the reductant delivery system controller 124, if the current average conversion efficiency ($\Delta_{CE, G}$) is greater than the secondary conversion efficiency level threshold ($L_{CE, secondary}$). Block 518 may be represented by the following equations, only one of which can be true at any given time:

$$\Delta_{CE,G} \leq L_{CE,secondary} \qquad (31)$$

$$\Delta_{CE,G} > L_{CE,secondary} \qquad (32)$$

If the reductant delivery system controller 124 determines that the current average conversion efficiency ($\Delta_{CE, G}$) is greater than the secondary conversion efficiency level threshold ($L_{CE}$) (e.g., if Equation (32) is true), the reductant delivery system control strategy 200 continues with determining if the SCR catalyst 110 is experiencing persistent reductant slip. Persistent reductant slip may occur where the SCR catalyst 110 is saturated and cannot adsorb anymore reductant, thereby causing reductant to slip through the SCR catalyst 110 towards the $SONO_x$ sensor 112. This reductant slip may impede accurate measurement of the $NO_x$ exiting the SCR catalyst 110.

The reductant delivery system control strategy 200 continues in block 600 with determining, by the reductant delivery system controller 124, a tertiary conversion efficiency level threshold ($L_{CE, tertiary}$). The tertiary conversion efficiency level threshold ($L_{CE, tertiary}$) is different and distinct from the initial conversion efficiency level threshold ($L_{CE, initial}$), and the secondary conversion efficiency level threshold ($L_{CE, secondary}$). The tertiary conversion efficiency level threshold ($L_{CE, tertiary}$) may be stored in the reductant delivery system controller 124 and may be constant or varied over time (e.g., the reductant delivery system controller 124 may determine the tertiary conversion efficiency level threshold ($L_{CE, tertiary}$) via machine learning, etc.). The tertiary conversion efficiency level threshold ($L_{CE, tertiary}$) is a function of the temperature of the exhaust gases in the aftertreatment system 100 (e.g., as measured by a sensor downstream of the SCR catalyst 110, etc.) and a flow rate of the exhaust gases in the aftertreatment system 100 (e.g., as measured by a sensor downstream of the SCR catalyst 110, etc.). In various embodiments, when the temperature of the exhaust gases in the aftertreatment system 100 is 250° C., the tertiary conversion efficiency level threshold ($L_{CE, tertiary}$) is 40% and when the temperature of the exhaust gases in the aftertreatment system 100 is 300° C., the tertiary conversion efficiency level threshold ($L_{CE, tertiary}$) is 60%. In other embodiments, the tertiary conversion efficiency level threshold ($L_{CE, tertiary}$) is equal to the product of the initial conversion efficiency level threshold ($L_{CE, initial}$) and a constant. In such embodiments, the tertiary conversion efficiency level threshold ($L_{CE, tertiary}$) is a percentage (e.g., a minimum percentage) of the initial conversion efficiency level threshold ($L_{CE, initial}$). In other embodiments, the tertiary conversion efficiency level threshold ($L_{CE, tertiary}$) is equal to the product of the secondary conversion efficiency level threshold ($L_{CE, secondary}$) and a constant. In such embodiments, the tertiary conversion efficiency level threshold ($L_{CE, tertiary}$) is a percentage (e.g., a minimum percentage) of the secondary conversion efficiency level threshold ($L_{CE, secondary}$). In other embodiments, the tertiary conversion efficiency level threshold ($L_{CE, tertiary}$) is a fixed value that is not a function of the initial conversion efficiency level threshold ($L_{CE, initial}$), or the secondary conversion efficiency level threshold ($L_{CE, secondary}$). In other embodiments, the tertiary conversion efficiency level threshold ($L_{CE, tertiary}$) is a bounded range, rather than a single value.

The reductant delivery system control strategy 200 then continues in block 602 with determining, by the reductant delivery system controller 124, if the current average conversion efficiency ($\Delta_{CE, G}$) is less than the tertiary conversion efficiency level threshold ($L_{CE, tertiary}$). Block 602 may be represented by the following equations, only one of which can be true at any given time:

$$\Delta_{CE,G} \geq L_{CE,tertiary} \quad (33)$$

$$\Delta_{CE,G} < L_{CE,tertiary} \quad (34)$$

If the reductant delivery system controller 124 determines that the current average conversion efficiency ($\Delta_{CE, G}$) is less than the tertiary conversion efficiency level threshold ($L_{CE, tertiary}$) (e.g., if Equation (34) is true), the reductant delivery system control strategy 200 continues in block 604 with determining by the reductant delivery system controller 124, if the previous average conversion efficiency ($\Delta_{CE, G-1}$) is less than the tertiary conversion efficiency level threshold ($L_{CE, tertiary}$). Block 604 may be represented by the following equations, only one of which can be true at any given time:

$$\Delta_{CE,G-1} \geq L_{CE,tertiary} \quad (35)$$

$$\Delta_{CE,G-1} < L_{CE,tertiary} \quad (36)$$

If the reductant delivery system controller 124 determines that the current average conversion efficiency ($\Delta_{CE, G}$) is less than the tertiary conversion efficiency level threshold ($L_{CE, tertiary}$) (e.g., if Equation (36) is true), the reductant delivery system control strategy 200 continues in block 606 with determining by the reductant delivery system controller 124, if the next previous average conversion efficiency ($\Delta_{CE, G-2}$) is less than the tertiary conversion efficiency level threshold ($L_{CE, tertiary}$). Block 606 may be represented by the following equations, only one of which can be true at any given time:

$$\Delta_{CE,G-2} \geq L_{CE,tertiary} \quad (37)$$

$$\Delta_{CE,G-2} < L_{CE,tertiary} \quad (38)$$

If the reductant delivery system controller 124 determines that the next previous average conversion efficiency ($\Delta_{CE, G-2}$) is less than the tertiary conversion efficiency level threshold ($L_{CE, tertiary}$) (e.g., if Equation (38) is true), the reductant delivery system control strategy 200 continues in block 608 with increasing, by the reductant delivery system controller 124, the positive bias counter (P) by one. The positive bias counter (P) is different and distinct from the local counter (c) and the global counter (G).

If in block 404, the absolute value of the $SONO_x$ average differential ($\Delta_{SONOx, G}$) is not greater than the $SONO_x$ spike initial threshold ($S_{SONOx, initial}$) (e.g., if Equation (26) is true), the absolute value of the $SONO_x$ average differential ($\Delta_{SONOx, G}$) changed less than it should have and the reductant delivery system control strategy 200 continues to block 608, thereby increasing the positive bias counter (P) by one.

If in block 518, the reductant delivery system controller 124 determines that the current average conversion efficiency ($\Delta_{CE, G}$) is not greater than the secondary conversion efficiency level threshold ($L_{CE}$) (e.g., if Equation (31) is true), the reductant delivery system control strategy 200 continues to block 608, thereby increasing the positive bias counter (P) by one.

If in block 606, the reductant delivery controller determines that the next previous average conversion efficiency ($\Delta_{CE, G-2}$) is not less than the tertiary conversion efficiency level threshold ($L_{CE, tertiary}$) (e.g., if Equation (37) is true), the reductant delivery system controller 124 does not increase the positive bias counter (P) by one. Similarly, if in block 604, the reductant delivery controller determines that the previous average conversion efficiency ($\Delta_{CE, G-1}$) is not less than the tertiary conversion efficiency level threshold ($L_{CE, tertiary}$) (e.g., if Equation (35) is true), the reductant delivery system controller 124 does not increase the positive bias counter (P) by one.

It is understood that additional operations, similar to block 606, may be included in the reductant delivery system control strategy 200, such that a target number of previous average conversion efficiencies are compared to the tertiary conversion efficiency level threshold ($L_{CE, tertiary}$) to determine if the positive bias counter (P) is to be increased by one. Additionally or alternatively, averages or other products, summations, of the average conversion efficiencies may be utilized in block 602, block 604, block 606, and/or in any similar operations.

If in block 602, the reductant delivery controller determines that the current average conversion efficiency ($\Delta_{CE, G}$) is not less than the tertiary conversion efficiency level threshold ($L_{CE, tertiary}$) (e.g., if Equation (33) is true), the reductant delivery system controller 124 does not increase the positive bias counter (P) by one. Instead, the reductant delivery system control strategy 200 continues in block 700 with determining, by the reductant delivery system controller 124, a quaternary conversion efficiency level threshold ($L_{CE, quaternary}$). The quaternary conversion efficiency level threshold ($L_{CE, quaternary}$) is different and distinct from the initial conversion efficiency level threshold ($L_{CE, quaternary}$), the secondary conversion efficiency level threshold ($L_{CE, secondary}$), and the tertiary conversion efficiency level threshold ($L_{CE, tertiary}$). The quaternary conversion efficiency level threshold ($L_{CE, quaternary}$) may be stored in the reductant delivery system controller 124 and may be constant or varied over time (e.g., the reductant delivery system controller 124 may determine the quaternary conversion efficiency level threshold ($L_{CE, quaternary}$) via machine learning, etc.). The quaternary conversion efficiency level threshold ($L_{CE, quaternary}$) is a function of the temperature of the exhaust gases in the aftertreatment system 100 (e.g., as measured by a sensor downstream of the SCR catalyst 110, etc.) and a flow rate of the exhaust gases in the aftertreatment system 100 (e.g., as measured by a sensor downstream of the SCR catalyst 110, etc.). In various embodiments, when the temperature of the exhaust gases in the aftertreatment system 100 is 250° C., the quaternary conversion efficiency level threshold ($L_{CE,\ quaternary}$) is 60% and when the temperature of the exhaust gases in the aftertreatment system 100 is 300° C., the quaternary conversion efficiency level threshold ($L_{CE,\ quaternary}$) is 70%. In other embodiments, the quaternary conversion efficiency level threshold ($L_{CE,\ quaternary}$) is equal to the product of the initial conversion efficiency level threshold ($L_{CE,\ initial}$) and a constant. In such embodiments, the quaternary conversion efficiency level threshold ($L_{CE,\ quaternary}$) is a percentage (e.g., a minimum percentage) of the initial conversion efficiency level threshold ($L_{CE,\ initial}$). In other embodiments, the quaternary conversion efficiency level threshold ($L_{CE,\ quaternary}$) is equal to the product of the secondary conversion efficiency level threshold ($L_{CE,\ secondary}$) and a constant. In such embodiments, the quaternary conversion efficiency level threshold ($L_{CE,\ quaternary}$) is a percentage (e.g., a minimum percentage) of the secondary conversion efficiency level threshold ($L_{CE,\ secondary}$). In other embodiments, the quaternary conversion efficiency level threshold ($L_{CE,\ quaternary}$) is equal to the product of the tertiary conversion efficiency level threshold ($L_{CE,\ tertiary}$) and a constant. In such embodiments, the quaternary conversion efficiency level threshold ($L_{CE,\ quaternary}$) is a percentage (e.g., a minimum percentage) of the tertiary conversion efficiency level threshold ($L_{CE,\ tertiary}$). In other embodiments, the quaternary conversion efficiency level threshold ($L_{CE,\ quaternary}$) is a fixed value that is not a function of the initial conversion efficiency level threshold ($L_{CE,\ initial}$), the secondary conversion efficiency level threshold ($L_{CE,\ secondary}$), or the tertiary conversion efficiency level threshold ($L_{CE,\ tertiary}$). In other embodiments, the quaternary conversion efficiency level threshold ($L_{CE,\ quaternary}$) is a bounded range, rather than a single value.

The reductant delivery system control strategy 200 then continues in block 702 with determining, by the reductant delivery system controller 124, if the current average conversion efficiency ($\Delta_{CE,\ G}$) is greater than the quaternary conversion efficiency level threshold ($L_{CE,\ quaternary}$). Block 702 may be represented by the following equations, only one of which can be true at any given time:

$$\Delta_{CE,G} > L_{CE,quaternary} \quad (39)$$

$$\Delta_{CE,G} \leq L_{CE,quaternary} \quad (40)$$

If the reductant delivery system controller 124 determines that the current average conversion efficiency ($\Delta_{CE,\ G}$) is greater than the quaternary conversion efficiency level threshold ($L_{CE,\ quaternary}$) (e.g., if Equation (39) is true), the reductant delivery system control strategy 200 continues in block 704 with determining by the reductant delivery system controller 124, if the previous average conversion efficiency ($\Delta_{CE,\ G-1}$) is greater than the quaternary conversion efficiency level threshold ($L_{CE,\ quaternary}$). Block 704 may be represented by the following equations, only one of which can be true at any given time:

$$\Delta_{CE,G-1} > L_{CE,quaternary} \quad (41)$$

$$\Delta_{CE,G-1} \leq L_{CE,quaternary} \quad (42)$$

If the reductant delivery system controller 124 determines that the current average conversion efficiency ($\Delta_{CE,\ G}$) is greater than the tertiary conversion efficiency level threshold ($L_{CE,\ tertiary}$) (e.g., if Equation (41) is true), the reductant delivery system control strategy 200 continues in block 706 with increasing, by the reductant delivery system controller 124, the negative bias counter (N) by one. The negative bias counter (N) is different and distinct from the positive bias counter (P), the local counter (c), and the global counter (G).

If in block 408, the absolute value of the $SONO_x$ average differential ($\Delta_{SONOx,\ G}$) is not less than the $SONO_x$ spike initial threshold ($S_{SONOx,\ initial}$) (e.g., if Equation (27) (28) is true), the absolute value of the $SONO_x$ average differential ($\Delta_{SONOx,\ G}$) changed more than it should have and the reductant delivery system control strategy 200 continues to block 706, thereby increasing the negative bias counter (N) by one.

If in block 514, the reductant delivery system controller 124 determines that the current average conversion efficiency ($\Delta_{CE,\ G}$) is not less than the initial conversion efficiency level threshold ($L_{CE,\ initial}$) (e.g., if Equation (30) is true), the reductant delivery system control strategy 200 continues to block 706, thereby increasing the negative bias counter (N) by one.

If in block 704, the reductant delivery controller determines that the previous average conversion efficiency ($\Delta_{CE,\ G-1}$) is not greater than the quaternary conversion efficiency level threshold ($L_{CE,\ quaternary}$) (e.g., if Equation (42) is true), the reductant delivery system controller 124 does not increase the negative bias counter (N) by one. Similarly, if in block 702, the reductant delivery controller determines that the average conversion efficiency ($\Delta_{CE,\ G}$) is not greater than the quaternary conversion efficiency level threshold ($L_{CE,\ quaternary}$) (e.g., if Equation (40) is true), the reductant delivery system controller 124 does not increase the negative bias counter (N) by one.

It is understood that additional operations, similar to block 704, may be included in the reductant delivery system control strategy 200, such that a target number of previous average conversion efficiencies are compared to the quaternary conversion efficiency level threshold ($L_{CE,\ quaternary}$) to determine if the negative bias counter (N) is to be increased by one. Additionally or alternatively, averages or other products, summations, of the average conversion efficiencies may be utilized in block 702, block 704, and/or in any similar operations. However, the number of previous average conversion efficiencies compared to the quaternary conversion efficiency level threshold ($L_{CE,\ quaternary}$) does not exceed the number of previous average conversion efficiencies compared to the tertiary conversion efficiency level threshold ($L_{CE,\ tertiary}$).

In various embodiments, the initial conversion efficiency level threshold ($L_{CE,\ initial}$) is greater than the secondary conversion efficiency level threshold ($L_{CE,\ secondary}$), the quaternary conversion efficiency level threshold ($L_{CE,\ quaternary}$) is greater than the secondary conversion efficiency level threshold ($L_{CE,\ secondary}$) and less than the initial conversion efficiency level threshold ($L_{CE,\ initial}$), and the tertiary conversion efficiency level threshold ($L_{CE,\ tertiary}$) is less than the initial conversion efficiency level threshold ($L_{CE,\ initial}$), less than the quaternary conversion efficiency level threshold ($L_{CE,\ quaternary}$), and greater than the secondary conversion efficiency level threshold ($L_{CE,\ secondary}$). This relationship is shown in the following equation:

$$L_{CE,initial} > L_{CE,quaternary} > L_{CE,tertiary} > L_{CE,secondary} \quad (43)$$

Figure 11:
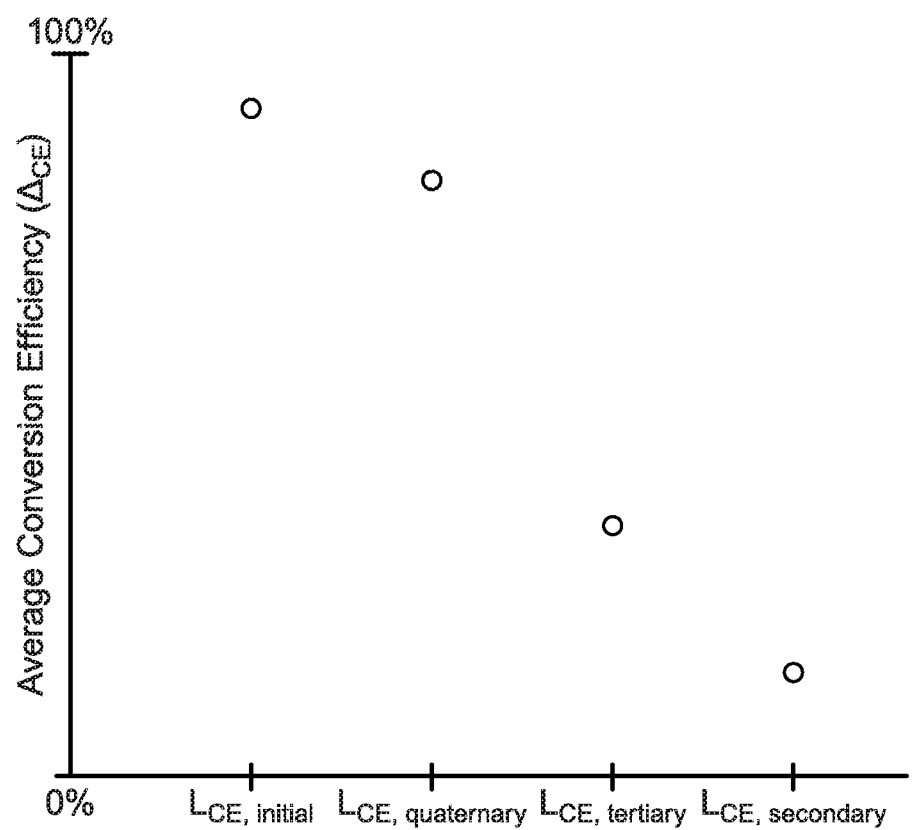
FIG. 11 is a diagram of various variables utilizes in the example reductant delivery system control strategy FIGS. 2-10.

This relationship is also shown in FIG. 11. The initial conversion efficiency level threshold ($L_{CE,\ initial}$), the secondary conversion efficiency level threshold ($L_{CE,\ secondary}$), the tertiary conversion efficiency level threshold ($L_{CE, tertiary}$), and the quaternary conversion efficiency level threshold ($L_{CE, quaternary}$) and the temperature of the exhaust gases in the aftertreatment system 100 and the flow rate of the exhaust gases in the aftertreatment system 100 (e.g., as measured by a sensor downstream of the SCR catalyst 110, etc.) is shown in Table 8, according to various embodiments.

TABLE 8

Relationships Between Conversion Efficiency Level Thresholds and Temperature and Flow Rate According to Various Embodiments.

| Temperature [° C.] | Flow Rate [grams/second] | Initial Conversion Efficiency Level Threshold ($L_{CE,initial}$) [%] | Secondary Conversion Efficiency Level Threshold ($L_{CE,secondary}$) [%] | Tertiary Conversion Efficiency Level Threshold ($L_{CE,tertiary}$) [%] | Quaternary Conversion Efficiency Level Threshold ($L_{CE,quaternary}$) [%] |
|---|---|---|---|---|---|
| 200 | 80 | 70 | | | |
| 200 | 60 | | 50 | | |
| 200 | 70 | | | 60 | |
| 200 | 85 | | | | 80 |
| 300 | 95 | 90 | | | |
| 300 | 70 | | 70 | | |
| 300 | 75 | | | 70 | |
| 300 | 90 | | | | 90 |
| 400 | 80 | 70 | | | |
| 400 | 60 | | 40 | | |
| 400 | 70 | | | 60 | |
| 400 | 85 | | | | 75 |

After the positive bias counter (P) and negative bias counter (N) have been increased, or have had the opportunity to have been increased, the reductant delivery system control strategy 200 continues in block 800 with determining, by the reductant delivery system controller 124, a target global counter ($G_{target}$). The target global counter ($G_{target}$) may be stored in the reductant delivery system controller 124 and may be constant or varied over time (e.g., the reductant delivery system controller 124 may determine the target global counter ($G_{target}$) via machine learning, etc.). The target global counter ($G_{target}$) may be a function of the current average conversion efficiency ($\Delta_{CE, G}$).

The reductant delivery system control strategy 200 continues in block 802 with determining, by the reductant delivery system controller 124, if the global counter (G) is equal to the target global counter ($G_{target}$). Block 802 may be represented by the following equations, only one of which can be true at any given time:

$$G < G_{target} \tag{44}$$

$$G = G_{target} \tag{45}$$

If in block 802, the global counter (G) is less than the target global counter ($G_{target}$) (e.g., if Equation (44) is true), the reductant delivery system control strategy 200 continues with block 204.

However, if in block 802, the global counter (G) is equal to the target global counter ($G_{target}$) (e.g., if Equation (45) is true), the reductant delivery system control strategy 200 continues in block 804 with determining, by the reductant delivery system controller 124, a global average conversion efficiency (Y). The global average conversion efficiency (Y) may be determined in a variety of fashions such that the reductant delivery system control strategy 200 is tailored for a target application.

In various embodiments, the global average conversion efficiency (Y) is determined by averaging the average conversion efficiencies ($\Delta_{CE}$) indexed with global counters of all values (e.g., $CE_1$ through $CE_{Gtarget}$). Block 804 may be represented by the following equation:

$$Y = \frac{\sum_{i=1}^{G_{target}} \Delta_{CE,G}}{G_{target}} \tag{46}$$

The reductant delivery system control strategy 200 continues in block 806 with determining, by the reductant delivery system controller 124, a target global average conversion efficiency (U). The target global average conversion efficiency (U) may be stored in the reductant delivery system controller 124 and may be constant or varied over time (e.g., the reductant delivery system controller 124 may determine the target global average conversion efficiency (U) via machine learning, etc.). In various embodiments, the target global average conversion efficiency (U) is greater than 95%.

The reductant delivery system control strategy 200 continues in block 808 with determining, by the reductant delivery system controller 124, if the global average conversion efficiency (Y) is greater than the target global average conversion efficiency (U). Block 808 may be represented by the following equations, only one of which can be true at any given time:

$$Y \leq U \tag{47}$$

$$Y > U \tag{48}$$

If in block 808, the global average conversion efficiency (Y) is not greater than the target global average conversion efficiency (U) (e.g., if Equation (47) is true), the reductant delivery system control strategy 200 continues with block 204.

If in block 808, the global average conversion efficiency (Y) is greater than the target global average conversion efficiency (U) (e.g., if Equation (48) is true), the reductant delivery system control strategy 200 continues in block 810 with determining, by the reductant delivery system controller 124, a target negative bias counter (Q). The target negative bias counter (Q) may be stored in the reductant delivery system controller 124 and may be constant or varied over time (e.g., the reductant delivery system controller 124 may determine the target negative bias counter (Q) via machine learning, etc.). The target negative bias counter (Q) may be a function of the current average conversion efficiency ($\Delta_{CE, G}$). In various embodiments, the target negative bias counter (Q) is 1.

The reductant delivery system control strategy 200 continues in block 812 with determining, by the reductant delivery system controller 124, if the negative bias counter (N) is less than the target negative bias counter (Q). Block 812 may be represented by the following equations, only one of which can be true at any given time:

$$N < Q \tag{49}$$

$$N \geq Q \tag{50}$$

If in block 812, the negative bias counter (N) is not less than the target negative bias counter (Q) (e.g., if Equation (50) is true), the reductant delivery system control strategy 200 continues in block 814 with setting, by the reductant delivery system controller 124, a bias constant ($\psi$) equal to −1. The bias constant ($\psi$) is used to indicate whether the bias is positive, due to overdosing of the reductant by the reductant delivery system 102, or negative, due to under dosing of the reductant by the reductant delivery system 102.

The reductant delivery system control strategy 200 continues in block 816 with determining, by the reductant delivery system controller 124, a global average $SONO_x$ average measurement (Z). The global average $SONO_x$ average measurement (Z) may be determined in a variety of fashions such that the reductant delivery system control strategy 200 is tailored for a target application.

In various embodiments, the global average $SONO_x$ average measurement (Z) is determined by averaging the $SONO_x$ average measurements (W) indexed with global counters of all values (e.g., $W_1$ through $W_{Gtarget}$). Block 816 may be represented by the following equation:

$$Z = \frac{\sum_{i=1}^{G_{target}} W_G}{G_{target}} \tag{51}$$

The reductant delivery system control strategy 200 continues in block 818 with determining, by the reductant delivery system controller 124, a global low conversion efficiency time (X) (e.g., a current low conversion efficiency time). The global low conversion efficiency time (X) may be determined in a variety of fashions such that the reductant delivery system control strategy 200 is tailored for a target application.

In various embodiments, the global low conversion efficiency time (X) is determined by dividing the low conversion efficiency level counter (A) by the target global counter ($G_{target}$). Block 818 may be represented by the following equation:

$$X = \frac{A}{G_{target}} \tag{52}$$

The reductant delivery system control strategy 200 continues in block 820 with determining, by the reductant delivery system controller 124, a bias index (B). The bias index (B) may be determined in a variety of fashions such that the reductant delivery system control strategy 200 is tailored for a target application.

In various embodiments, the bias index (B) is determined by multiplying the bias constant ($\psi$) by the sum of the global low conversion efficiency time (X) and the global average $SONO_x$ average measurement (Z). Block 820 may be represented by the following equation:

$$B = \psi * (X+Z) \tag{53}$$

The reductant delivery system control strategy 200 continues in block 822 with indexing, by the reductant delivery system controller 124, the bias index (B) with the universal counter ($\Omega$). This indexing produces a universally-indexed bias index ($B_\Omega$) having two components: one being the bias index (B) and the other being the universal counter ($\Omega$). A listing of a portion of the universally-indexed bias indexes ($B_\Omega$), according to some embodiments, is shown in Table 9 below.

TABLE 9

Listing of a Portion of the Universally-Indexed Bias Indexes ($B_\Omega$)

| Universally-Indexed Bias Index ($B_\Omega$) | Bias Index (B) | Universal Counter ($\Omega$) |
|---|---|---|
| $B_1$ | AAA | 0 |
| $B_2$ | BBB | 1 |
| $B_3$ | CCC | 2 |
| $B_4$ | DDD | 3 |
| . | . | . |
| . | . | . |
| . | . | . |

If in block 812, the negative bias counter (N) is less than the target negative bias counter (1) (e.g., if Equation (49) is true), the reductant delivery system control strategy 200 continues in block 824 with determining, by the reductant delivery system controller 124, a target positive bias counter (I). The target positive bias counter (I) may be stored in the reductant delivery system controller 124 and may be constant or varied over time (e.g., the reductant delivery system controller 124 may determine the target positive bias counter (I) via machine learning, etc.). The target positive bias counter (I) may be a function of the current average conversion efficiency ($\Delta_{CE, G}$). In various embodiments, the target positive bias counter (I) is 1.

The reductant delivery system control strategy 200 continues in block 826 with determining, by the reductant delivery system controller 124, if the positive bias counter (P) is less than the target positive bias counter (I). Block 826 may be represented by the following equations, only one of which can be true at any given time:

$$P < I \tag{54}$$

$$P \geq I \tag{55}$$

If in block 826, the positive bias counter (P) is not less than the target positive bias counter (I) (e.g., if Equation (54) is true), the reductant delivery system control strategy 200 continues in block 828 with setting, by the reductant delivery system controller 124, the bias constant ($\psi$) equal to 1. The reductant delivery system control strategy 200 then continues with block 816.

If in block 826, the positive bias counter (P) is less than the target positive bias counter (I) (e.g., if Equation (55) is true), the reductant delivery system control strategy 200 continues in block 830 with setting, by the reductant delivery system controller 124, the bias index (B) equal to 0. The reductant delivery system control strategy 200 then continues with block 822.

The reductant delivery system control strategy 200 then continues in block 832 with determining, by the reductant delivery system controller 124, if the bias index ($B_\Omega$) is less than 0 (e.g., a bias index threshold). Block 832 may be represented by the following equations, only one of which can be true at any given time:

$$B_\Omega < 0 \tag{56}$$

$$B_\Omega \geq 0 \tag{57}$$

If in block 832, the bias index ($B_\Omega$) is less than 0 (e.g., if Equation (56) is true), the reductant delivery system control strategy 200 continues in block 834 with determining, if the bias index ($B_\Omega$) is greater than the previous bias index ($B_{\Omega-1}$). Block 834 may be represented by the following equations, only one of which can be true at any given time:

$$B_\Omega > B_{\Omega-1} \tag{58}$$

$$B_\Omega \leq B_{\Omega-1} \tag{59}$$

If in block 834, the bias index ($B_\Omega$) is not greater than the previous bias index ($B_{\Omega-1}$) (e.g., if Equation (59) is true), then the reductant delivery system control strategy 200 continues in block 836 with increasing, by the reductant delivery system controller 124, the negative incremental counter ($\beta$) by 1.

The reductant delivery system control strategy 200 in block 900 with determining, by the reductant delivery system controller 124, a negative incremental counter threshold ($\sigma$). The negative incremental counter threshold ($\sigma$) may be stored in the reductant delivery system controller 124 and may be constant or varied over time (e.g., the reductant delivery system controller 124 may determine the negative incremental counter threshold ($\sigma$) via machine learning, etc.). In various embodiments, the negative incremental counter threshold ($\sigma$) is 1.

The reductant delivery system control strategy 200 continues in block 902 with determining, by the reductant delivery system controller 124, if the negative incremental counter ($\beta$) is less than the negative incremental counter threshold ($\sigma$). Block 902 may be represented by the following equations, only one of which can be true at any given time:

$$\beta < \sigma \tag{60}$$

$$\beta \geq \sigma \tag{61}$$

If in block 902, the negative incremental counter ($\beta$) is not less than negative incremental counter threshold ($\sigma$) (e.g., if Equation (61) is true), the reductant delivery system control strategy 200 continues in block 904 with determining, by the reductant delivery system controller 124, a correction using the bias index ($B_{106}$) (e.g., using an inverse of the bias index ($B_\Omega$), etc.). The correction may be a change in the voltage and/or frequency of the electricity supplied to the reductant pump 120. The correction may be a change in operating pressure and/or operating speed of the reductant pump 120. The correction may be a change in orifice size of the injector 138 (e.g., where the injector 138 is a variably sized injector, etc.). The reductant delivery system control strategy 200 continues in block 906 with implementing, by the reductant delivery system controller 124, the correction. This implementation may be carried out via a communication from the reductant delivery system controller 124 to, for example, the reductant pump 120.

If in block 834, the bias index ($B_\Omega$) is greater than the previous bias index ($B_{\Omega-1}$) (e.g., if Equation (58) is true), then the reductant delivery system control strategy 200 continues with block 900.

If in block 832, the bias index ($B_\Omega$) is not less than 0 (e.g., if Equation (57) is true), the reductant delivery system control strategy 200 continues in block 910 with determining, if the bias index ($B_\Omega$) is less than the previous bias index ($B_{\Omega-1}$). Block 910 may be represented by the following equations, only one of which can be true at any given time:

$$B_\Omega < B_{\Omega-1} \tag{62}$$

$$B_\Omega \geq B_{\Omega-1} \tag{63}$$

If in block 910, the bias index ($B_\Omega$) is not less than the previous bias index ($B_{\Omega-1}$) (e.g., if Equation (63) is true), then the reductant delivery system control strategy 200 continues in block 912 with increasing, by the reductant delivery system controller 124, the positive incremental counter ($\alpha$) by 1.

The reductant delivery system control strategy 200 in block 914 with determining, by the reductant delivery system controller 124, a positive incremental counter threshold ($\gamma$). The positive incremental counter threshold ($\gamma$) may be stored in the reductant delivery system controller 124 and may be constant or varied over time (e.g., the reductant delivery system controller 124 may determine the positive incremental counter threshold ($\gamma$) via machine learning, etc.). In various embodiments, positive incremental counter threshold ($\gamma$) is 1.

The reductant delivery system control strategy 200 continues in block 916 with determining, by the reductant delivery system controller 124, if the positive incremental counter ($\alpha$) is less than the positive incremental counter threshold ($\gamma$). Block 916 may be represented by the following equations, only one of which can be true at any given time:

$$\alpha < \gamma \tag{64}$$

$$\alpha \geq \gamma \tag{65}$$

If in block 916, the positive incremental counter ($\alpha$) is not less than positive incremental counter threshold ($\gamma$) (e.g., if Equation (65) is true), the reductant delivery system control strategy 200 continues with block 904.

In combination, blocks 904 and 906 cause the reductant dosed into the exhaust gases to increase when the negative incremental counter ($\beta$) is not less than the negative incremental counter threshold ($\sigma$), to account for negative dosing bias, and cause the reductant dosed into the exhaust gases to decrease when the positive incremental counter ($\alpha$) is not less than positive incremental counter threshold ($\gamma$), to account for positive dosing bias.

The reductant delivery system control strategy 200 continues in block 1000 with determining, by the reductant delivery system controller 124, an absolute bias index ($\theta$). The absolute bias index ($\theta$) is calculated by computing the absolute value of the bias index ($B_\Omega$). Block 1000 may be represented by the following equation:

$$\theta = |B_\Omega| \tag{66}$$

The reductant delivery system control strategy 200 continues in block 1002 with indexing, by the reductant delivery system controller 124, the absolute bias index ($\theta$) with the universal counter ($\Omega$). This indexing produces a universally-indexed absolute bias index ($\theta_\Omega$) having two components: one being the absolute bias index ($\theta$) and the other being the universal counter ($\Omega$). A listing of a portion of the universally-indexed absolute bias indexes ($\theta_\Omega$), according to some embodiments, is shown in Table 10 below.

TABLE 10

Listing of a Portion of the Universally-Indexed Absolute Bias Indexes ($\theta_\Omega$)

| Universally-Indexed Absolute Bias Index ($\theta_\Omega$) | Absolute Bias Index ($\theta$) | Bias Index (B) | Universal Counter ($\Omega$) |
|---|---|---|---|
| $\theta_1$ | \|AAA\| | AAA | 0 |
| $\theta_2$ | \|BBB\| | BBB | 1 |

TABLE 10-continued

Listing of a Portion of the Universally-Indexed Absolute Bias Indexes ($\theta_\Omega$)

| Universally-Indexed Absolute Bias Index ($\theta_\Omega$) | Absolute Bias Index ($\theta$) | Bias Index (B) | Universal Counter ($\Omega$) |
|---|---|---|---|
| $\theta_3$ | \|CCC\| | CCC | 2 |
| $\theta_4$ | \|DDD\| | DDD | 3 |
| . | . | . | . |
| . | . | . | . |
| . | . | . | . |

The reductant delivery system control strategy 200 then continues in block 1004 with determining, by the reductant delivery system controller 124, if the current absolute bias index ($\theta_\Omega$) is less than the previous absolute bias index ($\theta_{\Omega-1}$). Block 1004 may be represented by the following equations, only one of which can be true at any given time:

$$\theta_\Omega < \theta_{\Omega-1} \quad (67)$$

$$\theta_\Omega \geq \theta_{\Omega-1} \quad (68)$$

If the reductant delivery system controller 124 determines that the current absolute bias index ($\theta_\Omega$) is not less than the previous absolute bias index ($\theta_{\Omega-1}$) (e.g., if Equation (68) is true), the reductant delivery system control strategy 200 continues in block 1006 with determining, by the reductant delivery system controller 124, if the current absolute bias index ($\theta_\Omega$) is less than the next previous absolute bias index ($\theta_{\Omega-2}$). Block 1006 may be represented by the following equations, only one of which can be true at any given time:

$$\theta_\Omega < \theta_{\Omega-2} \quad (69)$$

$$\theta_\Omega \geq \theta_{\Omega-2} \quad (70)$$

If the reductant delivery system controller 124 determines that the current absolute bias index ($\theta_\Omega$) is not less than the previous absolute bias index ($\theta_{\Omega-1}$) (e.g., if Equation (70) is true), the reductant delivery system control strategy 200 continues in block 1008 with increasing, by the reductant delivery system controller 124, the catalyst counter (K) by 1.

The reductant delivery system control strategy 200 in block 1010 with determining, by the reductant delivery system controller 124, a catalyst counter threshold ($\varphi$). The catalyst counter threshold ($\varphi$) may be stored in the reductant delivery system controller 124 and may be constant or varied over time (e.g., the reductant delivery system controller 124 may determine the catalyst counter threshold ($\varphi$) via machine learning, etc.). In various embodiments, the catalyst counter threshold ($\varphi$) is greater than 1 and less than or equal to 5. In one embodiments, the catalyst counter threshold ($\varphi$) is 3. The manufacturer may determine the catalyst counter threshold ($\varphi$) may by testing the reductant delivery system 102 and optimizing the reductant delivery system control strategy 200 so that $NO_x$ emissions by the aftertreatment system 100 are maintained at a desirable level and such that usage of the reductant delivery system 102 is maintained at a desirable level.

The reductant delivery system control strategy 200 continues in block 1012 with determining, by the reductant delivery system controller 124, if the catalyst counter (K) is less than the catalyst counter threshold ($\varphi$). Block 1012 may be represented by the following equations, only one of which can be true at any given time:

$$K < \varphi \quad (71)$$

$$K \geq \varphi \quad (72)$$

If in block 1012, the catalyst counter (K) is not less than catalyst counter threshold ($\varphi$) (e.g., if Equation (72) is true), the reductant delivery system control strategy 200 continues in block 1014 with ceasing, by the reductant delivery system controller 124, any correction that is being implemented by the reductant delivery system controller 124 (e.g., through block 906 in the current universal counter ($\Omega$) or a previous universal counter ($\Omega$). The reductant delivery system control strategy 200 then continues in block 1016 with indicating, by the reductant delivery system controller 124, that the SCR catalyst 112 is failed. In some embodiments, the reductant delivery system controller 124 indicates this failure by causing, by the reductant delivery system controller 124, the display device 134 to display an indication that the SCR catalyst 112 is failed (e.g., a message stating "CATALYST FAILED," a message stating "SERVICE CATALYST," etc.). In these embodiments, this indication causes the display device 134 to change from the static state to the alarm state.

The reductant delivery system control strategy 200 continues in block 1018 with setting, by the reductant delivery system controller 124, the global counter (G) to zero. The reductant delivery system control strategy 200 continues in block 1020 with increasing, by the reductant delivery system controller 124, the universal counter ($\Omega$) by 1. The reductant delivery system control strategy 200 then continues in block 204.

It is understood that additional operations, similar to block 1006, may be included in the reductant delivery system control strategy 200, such that a target number of previous absolute bias indexes are compared to the current absolute bias index ($\theta_\Omega$) to determine if the catalyst counter (K) is to be increased by one. Additionally or alternatively, averages or other products, summations, of the previous absolute bias indexes may be utilized in block 1004, block 1006, and/or in any similar operations.

If in block 902, the negative incremental counter ($\beta$) is less than negative incremental counter threshold ($\sigma$) (e.g., if Equation (60) is true), the reductant delivery system control strategy 200 continues with block 1000.

If in block 916, the positive incremental counter ($\alpha$) is less than positive incremental counter threshold ($\gamma$) (e.g., if Equation (64) is true), the reductant delivery system control strategy 200 continues with block 1000.

If in block 1012, the catalyst counter (K) is less than the catalyst counter threshold ($\varphi$) (e.g., if Equation (71) is true), then the reductant delivery system control strategy 200 continues with block 1018.

If in block 1006, the absolute bias index ($\theta_\Omega$) is less than the next previous absolute bias index ($\theta_{\Omega-2}$) (e.g., if Equation (69) is true), then the reductant delivery system control strategy 200 continues with block 1018.

If in block 1004, the absolute bias index ($\theta_\Omega$) is less than the previous absolute bias index ($\theta_{\Omega-1}$) (e.g., if Equation (67) is true), then the reductant delivery system control strategy 200 continues with block 1018.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to," "fluidly configured to communicate with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. An exhaust aftertreatment system comprising:
a catalyst;
an exhaust conduit system coupled to the catalyst;
a first sensor coupled to the exhaust conduit system upstream of the catalyst and configured to obtain a current first measurement upstream of the catalyst;
a second sensor coupled to the exhaust conduit system downstream of the catalyst and configured to obtain a current second measurement downstream of the catalyst;
a reductant pump configured to draw reductant from a reductant source;
a dosing module fluidly coupled to the reductant pump and configured to selectively provide the reductant from the reductant pump into the exhaust conduit system upstream of the catalyst; and
a reductant delivery system controller communicable with the first sensor, the second sensor, the reductant pump, and the dosing module, the reductant delivery system controller configured to:
receive and store the current first measurement from the first sensor,
receive and store the current second measurement from the second sensor,
cause the reductant pump to draw the reductant at a first rate,
cause the dosing module to provide a first amount of the reductant,
determine a current conversion efficiency based on the current first measurement and the current second measurement,
store the current conversion efficiency,
determine a current low conversion efficiency time based on the current conversion efficiency,
determine a current bias index based on the current low conversion efficiency time,
compare the current bias index to a bias index threshold, and
adjust at least one of the first rate or the first amount when the current bias index is greater than the bias index threshold.

2. The exhaust aftertreatment system of claim 1, wherein:
the first sensor is further configured to obtain, prior to obtaining the current first measurement, a previous first measurement upstream of the catalyst;
the second sensor is further configured to obtain, prior to obtaining the current second measurement, a previous second measurement downstream of the catalyst;
the reductant delivery system controller is further configured to:
receive and store the previous first measurement from the first sensor,
receive and store the previous second measurement from the second sensor,
determine a previous conversion efficiency based on the previous first measurement and the previous second measurement,
store the previous conversion efficiency,
determine, prior to determining the current low conversion efficiency time, a previous low conversion efficiency time based on the previous conversion efficiency,
determine, prior to determining the current bias index, a previous bias index based on the previous low conversion efficiency time, and
store the previous bias index; and
the previous bias index is the bias index threshold.

3. The exhaust aftertreatment system of claim 2, wherein:
the reductant delivery system controller is further configured to determine an average measurement by averaging the current second measurement and the previous second measurement; and the reductant delivery system controller is configured to determine the current bias index additionally based on the average measurement.

4. The exhaust aftertreatment system of claim 1, further comprising:
a catalyst temperature sensor coupled to the catalyst and configured to obtain a catalyst temperature of the catalyst;
wherein the reductant delivery system controller is communicable with the catalyst temperature sensor;
wherein the reductant delivery system controller is further configured to:
compare the catalyst temperature to a target catalyst temperature range, and
determine the current conversion efficiency after first determining that the catalyst temperature is within the target catalyst temperature range.

5. The exhaust aftertreatment system of claim 4, wherein:
the reductant delivery system controller is further configured to:
compare the current conversion efficiency to a target conversion efficiency range, and
determine the current low conversion efficiency time after first determining that the current conversion efficiency is within the target conversion efficiency range.

6. The exhaust aftertreatment system of claim 1, wherein:
the first sensor is further configured to obtain, prior to obtaining the current first measurement, a previous first measurement upstream of the catalyst;
the second sensor is further configured to obtain, prior to obtaining the current second measurement, a previous second measurement downstream of the catalyst;
the reductant delivery system controller is further configured to:
receive and store the previous first measurement from the first sensor,
receive and store the previous second measurement from the second sensor,
determine a previous conversion efficiency based on the previous first measurement and the previous second measurement,
store the previous conversion efficiency,
determine an average conversion efficiency based on the current conversion efficiency and the previous conversion efficiency,
compare the average conversion efficiency to a low conversion efficiency level threshold, and
increase a low conversion efficiency level counter in response to the average conversion efficiency not being less than the low conversion efficiency level threshold; and
the reductant delivery system controller is configured to determine the current low conversion efficiency time additionally based on the low conversion efficiency level counter.

7. The exhaust aftertreatment system of claim 1, wherein:
the second sensor is further configured to obtain, prior to obtaining the current second measurement, a previous second measurement downstream of the catalyst;
the reductant delivery system controller is further configured to:
receive and store the previous second measurement from the second sensor,
determine an average second measurement differential based on the current second measurement and the previous second measurement,
compare an absolute value of the average second measurement differential to a second measurement spike initial threshold, and
increase a positive bias counter in response to the absolute value of the average second measurement differential not being greater than the second measurement spike initial threshold; and
the reductant delivery system controller is configured to determine the current bias index additionally based on the positive bias counter.

8. The exhaust aftertreatment system of claim 7, wherein:
the reductant delivery system controller is further configured to:
compare the absolute value of the average second measurement differential to a second measurement spike secondary threshold in response to the absolute value of the average second measurement differential not being greater than the second measurement spike initial threshold, and
increase a negative bias counter in response to the absolute value of the average second measurement differential not being less than the second measurement spike secondary threshold; and
determining the current bias index is additionally based on the negative bias counter.

9. The exhaust aftertreatment system of claim 8, wherein:
the first sensor is further configured to obtain, prior to obtaining the current first measurement, a previous first measurement upstream of the catalyst; and
the reductant delivery system controller is further configured to:
receive and store the previous first measurement from the first sensor,
determine a previous conversion efficiency based on the previous first measurement and the previous second measurement,
store the previous conversion efficiency,
determine an average conversion efficiency based on the current conversion efficiency and the previous conversion efficiency,
compare the average conversion efficiency to an initial conversion efficiency level threshold in response to the absolute value of the average second measurement differential being less than the second measurement spike secondary threshold, and
increase the negative bias counter in response to the average conversion efficiency not being less than the initial conversion efficiency level threshold.

10. The exhaust aftertreatment system of claim 9, wherein:
the reductant delivery system controller is further configured to:
compare the average conversion efficiency to a secondary conversion efficiency level threshold in response to the average conversion efficiency being less than the initial conversion efficiency level threshold, and
increase the positive bias counter in response to the average conversion efficiency not being greater than the secondary conversion efficiency level threshold.

11. An exhaust aftertreatment system comprising:
a catalyst; a first sensor configured to obtain a current first measurement upstream of the catalyst;
a second sensor configured to:
obtain a current second measurement downstream of the catalyst; and obtain, prior to obtaining the current second measurement, a previous second measurement downstream of the catalyst;

a reductant pump configured to draw reductant from a reductant source;

a dosing module fluidly coupled to the reductant pump and configured to selectively provide the reductant from the reductant pump upstream of the catalyst; and a reductant delivery system controller communicable with the first sensor, the second sensor, the reductant pump, and the dosing module, the reductant delivery system controller configured to:

receive and store the previous second measurement from the second sensor, receive and store the current first measurement from the first sensor, receive and store the current second measurement from the second sensor, cause the reductant pump to draw the reductant at a first rate, cause the dosing module to provide a first amount of the reductant, determine a current conversion efficiency based on the current first measurement and the current second measurement, store the current conversion efficiency, determine a current low conversion efficiency time based on the current conversion efficiency, determine an average second measurement differential based on the current second measurement and the previous second measurement, compare an absolute value of the average second measurement differential to a second measurement spike initial threshold, increase a positive bias counter in response to the absolute value of the average second measurement differential not being greater than the second measurement spike initial threshold, compare the absolute value of the average second measurement differential to a second measurement spike secondary threshold in response to the absolute value of the average second measurement differential not being greater than the second measurement spike initial threshold, increase a negative bias counter in response to the absolute value of the average second measurement differential not being less than the second measurement spike secondary threshold, determine a current bias index based on the negative bias counter and at least one of: the current low conversion efficiency time or the positive bias counter, compare the current bias index to a bias index threshold, and adjust at least one of the first rate or the first amount when the current bias index is greater than the bias index threshold.

12. The exhaust aftertreatment system of claim 11, wherein:

the first sensor is further configured to obtain, prior to obtaining the current first measurement, a previous first measurement upstream of the catalyst;

the reductant delivery system controller is further configured to:

receive and store the previous first measurement from the first sensor, determine a previous conversion efficiency based on the previous first measurement and the previous second measurement, store the previous conversion efficiency, determine, prior to determining the current low conversion efficiency time, a previous low conversion efficiency time based on the previous conversion efficiency, determine, prior to determining the current bias index, a previous bias index based on the previous low conversion efficiency time, and store the previous bias index; and the previous bias index is the bias index threshold.

13. The exhaust aftertreatment system of claim 11, wherein:

the reductant delivery system controller is further configured to determine an average measurement by averaging the current second measurement and the previous second measurement; and the reductant delivery system controller is configured to determine the current bias index additionally based on the average measurement.

14. The exhaust aftertreatment system of claim 11, further comprising:

a catalyst temperature sensor coupled to the catalyst and configured to obtain a catalyst temperature of the catalyst;

wherein the reductant delivery system controller is communicable with the catalyst temperature sensor;

wherein the reductant delivery system controller is further configured to:

compare the catalyst temperature to a target catalyst temperature range, and determine the current conversion efficiency after determining that the catalyst temperature is within the target catalyst temperature range.

15. The exhaust aftertreatment system of claim 11, wherein:

the reductant delivery system controller is further configured to:

compare the current conversion efficiency to a target conversion efficiency range, and determine the current low conversion efficiency time after first determining that the current conversion efficiency is within the target conversion efficiency range.

16. The exhaust aftertreatment system of claim 11, wherein:

the first sensor is further configured to obtain, prior to obtaining the current first measurement, a previous first measurement upstream of the catalyst; and the reductant delivery system controller is further configured to:

receive and store the previous first measurement from the first sensor, determine a previous conversion efficiency based on the previous first measurement and the previous second measurement, store the previous conversion efficiency, determine an average conversion efficiency based on the current conversion efficiency and the previous conversion efficiency, compare the average conversion efficiency to an initial conversion efficiency level threshold in response to the absolute value of the average second measurement differential being less than the second measurement spike secondary threshold, and increase the negative bias counter in response to the average conversion efficiency not being less than the initial conversion efficiency level threshold.

17. The exhaust aftertreatment system of claim 16, wherein:
the reductant delivery system controller is further configured to:
compare the average conversion efficiency to a secondary conversion efficiency level threshold in response to the average conversion efficiency being less than the initial conversion efficiency level threshold, and
increase the positive bias counter in response to the average conversion efficiency not being greater than the secondary conversion efficiency level threshold.

18. An exhaust aftertreatment system comprising:
a catalyst;
a first sensor configured to obtain a current first measurement upstream of the catalyst;
a second sensor configured to obtain a current second measurement downstream of the catalyst;
a catalyst temperature sensor coupled to the catalyst and configured to obtain a temperature of the catalyst;
a reductant pump configured to draw reductant from a reductant source;
a dosing module fluidly coupled to the reductant pump and configured to selectively provide the reductant from the reductant pump upstream of the catalyst; and
a reductant delivery system controller communicable with the first sensor, the second sensor, the catalyst temperature sensor, the reductant pump, and the dosing module, the reductant delivery system controller configured to:
cause the reductant pump to draw the reductant at a first rate,
cause the dosing module to provide a first amount of the reductant,
receive and store the current first measurement from the first sensor,
receive and store the current second measurement from the second sensor,
determine that the first sensor is obtaining the current first measurement,
determine that the second sensor is obtaining the current second measurement,
compare the catalyst temperature to a target catalyst temperature range, and
after determining that (i) the first sensor is obtaining the current first measurement, (ii) the second sensor is obtaining the current second measurement, and (iii) the catalyst temperature is within the target catalyst temperature range, determine a current conversion efficiency based on the current first measurement and the current second measurement;
store the current conversion efficiency, and
adjust at least one of the first rate or the first amount based on the current conversion efficiency.

19. The exhaust aftertreatment system of claim 18, wherein:
the reductant delivery system controller is further configured to:
determine a current low conversion efficiency time based on the current conversion efficiency,
determine a current bias index based on the current low conversion efficiency time,
compare the current bias index to a bias index threshold, and
adjust at least one of the first rate or the first amount when the current bias index is greater than the bias index threshold.

20. The exhaust aftertreatment system of claim 19, wherein:
the first sensor is further configured to obtain, prior to obtaining the current first measurement, a previous first measurement upstream of the catalyst;
the second sensor is further configured to obtain, prior to obtaining the current second measurement, a previous second measurement downstream of the catalyst;
the reductant delivery system controller is further configured to:
receive and store the previous first measurement from the first sensor,
receive and store the previous second measurement from the second sensor,
determine a previous conversion efficiency based on the previous first measurement and the previous second measurement,
store the previous conversion efficiency,
determine, prior to determining the current low conversion efficiency time, a previous low conversion efficiency time based on the previous conversion efficiency,
determine, prior to determining the current bias index, a previous bias index based on the previous low conversion efficiency time,
determine an average measurement by averaging the current second measurement and the previous second measurement, and
store the previous bias index;
the previous bias index is the bias index threshold; and
the reductant delivery system controller is configured to determine the current bias index additionally based on the average measurement.

* * * * *